United States Patent
Caldwell et al.

(10) Patent No.: US 9,635,399 B2
(45) Date of Patent: Apr. 25, 2017

(54) SYSTEMS AND METHODS FOR EFFICIENTLY CHRONICLING BROADCAST CONTENT

(71) Applicant: The Dispatch Printing Company, Columbus, OH (US)

(72) Inventors: James Caldwell, Grove City, OH (US); Harold Roudabush, Columbus, OH (US); Carol Triplett, Columbus, OH (US); Josh Kapsch, Columbus, OH (US)

(73) Assignee: The Dispatch Printing Company, Columbus, OH (US)

( * ) Notice: Subject to any disclaimer, the term of this patent is extended or adjusted under 35 U.S.C. 154(b) by 0 days.

(21) Appl. No.: 14/798,908

(22) Filed: Jul. 14, 2015

(65) Prior Publication Data

US 2016/0021419 A1    Jan. 21, 2016

Related U.S. Application Data

(60) Provisional application No. 62/025,550, filed on Jul. 17, 2014.

(51) Int. Cl.
*H04N 21/24* (2011.01)
*H04N 21/2547* (2011.01)
*H04H 20/14* (2008.01)

(52) U.S. Cl.
CPC ........ *H04N 21/2407* (2013.01); *H04H 20/14* (2013.01); *H04N 21/2547* (2013.01)

(58) Field of Classification Search
CPC .... H04H 60/37; H04H 60/66; H04N 21/2407; H04N 21/2547; H04N 20/14
See application file for complete search history.

(56) References Cited

U.S. PATENT DOCUMENTS

| | | | | |
|---|---|---|---|---|
| 5,594,938 A | * | 1/1997 | Engel | H04N 7/10 348/731 |
| 6,681,394 B1 | * | 1/2004 | Fujita | H04N 7/165 348/E7.063 |
| 8,793,728 B1 | * | 7/2014 | Hundemer | H04N 21/23424 725/32 |
| 2009/0070808 A1 | * | 3/2009 | Jacobs | H04N 7/162 725/36 |
| 2012/0054794 A1 | * | 3/2012 | Kim | G06F 3/0346 725/38 |
| 2015/0293635 A1 | * | 10/2015 | Timpone | G06F 3/0412 345/173 |

\* cited by examiner

*Primary Examiner* — Benjamin R Bruckart
*Assistant Examiner* — Susan X Li
(74) *Attorney, Agent, or Firm* — Jones Day

(57) ABSTRACT

Systems and methods are provided for automatically capturing event occurrence data associated with a broadcast channel. A baseline schedule for the broadcast channel is imported that includes an identification of events scheduled to appear on the broadcast channel and scheduled times for those events. A prompt is provided via a graphical user interface for a user to enter a time of actual occurrence of event appearances on the broadcast channel. Indications of times of an appearance and that events did not air on the broadcast channel are received via the prompt. The indications are stored in a computer-readable medium, and a report is provided that identifies events that did appear on the broadcast channel and their time of appearance and events that did not appear on the broadcast channel.

30 Claims, 33 Drawing Sheets

Fig. 3

| 04:00:00 : 00:25:00 - CBS MORNING NEWS | | | | | |
|---|---|---|---|---|---|
| Aired | Set Time | Length | Mat. ID | Name | Comments | ISCI |

| Aired | Set Time | Length | Mat. ID | Name | Comments | ISCI |
|---|---|---|---|---|---|---|
| | 04:00:00 | 00:15:00 | | CBS MORNING NEWS: Segment 1 | | 5/15 Traffic Logs |
| | | | | POSITION #1 2:00 NETWORK | | |
| | | | | POSITION #2 1:30 NETWORK | | |
| | | | | :15 OPTIONAL LOCAL WEATHER CUTAWAY NOT AIRING | | |
| | | | | POS. #3 1:00 NETWORK/1:00 LOCAL | | |
| | | | | 00:01:00 - Local Spots | | |
| | 04:15:00 | 00:00:30 | 92918 | JD Equipment | JD EQUIPMENT-CRAFT | JD-CRAFTDEAL-0415 |
| | 04:15:30 | 00:00:30 | 93067 | Big Sandy Superstore | BIG SANDY | LMSBST040815AHR |
| | | | | :15 OPTIONAL LOCAL WEATHER CUTAWAY NOT AIRING | | |
| | 04:16:00 | 00:08:00 | | CBS MORNING NEWS: Segment 2 | | |
| | | | | POS. #4 1:00 NETWORK/1:00 LOCAL | | |
| | | | | 00:01:00 - Local Spots | | |
| | 04:24:00 | 00:00:15 | 90681 | Journeylite | JOURNEYLITE/FAST TRACK | JOURNEYLITE/SURGERY |
| | 04:25:15 | 00:00:30 | 99330 | Lifeline of Ohio | LIFELINE | LIFELINE1330 5 |
| | 04:24:45 | 00:00:15 | 90694 | Journeylite | JOURNEYLITE/FAST TRACK | JOURNEYLITE 4 CONTINUE SUCCESS |

| 04:25:00 : 00:34:30 - 10TV NEWS @ 4:30AM | | | | | | |
|---|---|---|---|---|---|---|
| Aired | Set Time | Length | Mat. ID | Name | Comments | ISCI |
| | 04:25:00 | 00:03:00 | | 10TV NEWS @ 4:30AM: Segment 1 | | 5/15 Traffic Logs |
| | | | | 00:01:30 - Local Spots | | |
| | 04:28:00 | 00:00:15 | 91029 | Buckeye Honda | BUCKEYE HONDA | BUT-168-AORIL-COROLLA |
| | 04:28:15 | 00:00:30 | 92097 | Resporative Health | RESTORATIVE HEALTH | ADM 5634 02 |
| | 04:28:45 | 00:00:30 | 92901 | Speedway | SPEEDWAY-GREAT FOOD CHOICES | SWT20150411H |
| | 04:29:00 | 00:00:15 | 98486 | Karen Hamilton Law Office | BANKRUPTCY LAW | K HAMILTON LAW INTRODUCTION 15 |
| | 04:29:30 | 00:06:00 | | 10TV NEWS @ 4:30AM: Segment 2 | | |
| | | | | 00:02:30 - Local Spots | | |
| | 04:35:30 | 00:00:15 | 92101 | Culligan Water Softener | CULLIGAN WATER SOFTENER | CCLE1514 |
| | 04:35:45 | 00:00:30 | 90300 | Central Ohio Chevy Dealers | CHEVROLET | GMATCO4SMOOH |

Fig. 4

| | | | | | | |
|---|---|---|---|---|---|---|
| ⌂ WBNS ▽ | | ▦ Show List | ⏲ Go To Current | ▦ 04/15 | ⦿ Logged in: JOSH LAPTOP ▽ | |
| Aired Air Time | Set Time | Length | Mat. ID | Advertiser/Location | Comments | ISCI |
| 12:30:00 : 01:00:00 - YOUNG AND RESTLESS  △Edit/Drop  ←Older  Newer→ | | | | | | |
| ⊘ | 12:30:00 | 00:28:41 | | YOUNG AND RESTLESS: Segment 1 | | |
| | | | | GROUP 09:00:15 Local Spots | | |
| ⊘ | 12:58:41 | 00:00:15 | 55625 | DR PHIL WEDNESDAY 15 | | DR PHIL WEDNESDAY 15 |
| | | | | HD-TODAY | | HD-TODAY |
| | | | | GROUP 00:01:00 Local Spots | | |
| ⊘ | 12:58:56 | 00:00:30 | 92884 | Oglebay Park | | OGLEBAY PARK |
| ⊘ | 12:59:26 | 00:00:30 | 10562 | Patient Recruiting | | SPRING VALUES |
| | | | | | | CBG-COPD-10T-OHCO |
| | | | | GROUP 00:00:04 Local Spots | | |
| ⊘ | 12:59:56 | 00:00:00 | 91611 | Ricart Automotive | | RICART |
| ⊘ | 13:00:00 | 00:28:41 | | YOUNG AND RESTLESS: Segment 2 | | RH04101SWBNSHD |
| | | | | GROUP 00:01:15 Local Spots | | |
| ⊘ | 13:28:41 | 00:00:15 | 92775 | E&J Gallo Winery | | E&J GALLO WINES  GLTV50010OH |
| ⊘ | 13:28:56 | 00:00:15 | 91029 | Buckeye Honda | | BUCKEYE HONDA  BUT-168-APRIL-COROLLA |
| ⊘ | 13:29:11 | 00:00:15 | 91322 | Bob Evans Restaurant | | BOB EVANS  B0EE0069000H |
| ⊘ | 13:29:26 | 00:00:30 | 90516 | Community Loans of | | COMMUNITY LOANS OF  CLA5255H |

Details | Orphans | Bins ▽

THE DR. OZ SHOW Episode:
6125-: Segment 3
☑ Edit Spot
▭ Copy to New Spot Bin
Contract #
⏲ Air Times:
None
☐ NOTES:
⊕ Add Note

*Fig. 5*

| | Aired | Air Time | Set Time | Length | Mat. ID | Advertiser/Location | Comments | ISCI |
|---|---|---|---|---|---|---|---|---|
| | ☐ | | 15:14:40 | 00:00:30 | 91514 | K 12 | K 12 | CFKT301215H |
| | | | | | | FOLLOWING SEGMENT INCLUDES FEE SPOTS | | |
| | ☐ | | 15:15:10 | 00:08:50 | | THE DR. OZ SHOW Episode:6125-:Segment 2 | | |
| | | | | | | GROUP 00:00:30 Local Spots | | |
| | ☐ | | 12:24:00 | 00:00:30 | 55044 | COLUMBUS MAYORAL DEBATE 4/16 | COLUMBUS MAYORAL DEBATE 4/16 | |
| | | | | | | GROUP 00:02:30 Local Spots | | |
| | ☐ | | 15:24:30 | 00:00:30 | 91311 | Big Sandy Superstore | BIG SANDY | LMSSSTTHANKS62H |
| | ☐ | | 15:25:00 | 00:00:30 | 91562 | Molina Health Care | MOLINA HEALTH CARE | OHRE-8230H |
| | ☐ | | 15:25:30 | 00:00:30 | 96941 | O'Conner, Acciani & Levy | OCONNER ACCIANI & LEVY | PMP OCON 023H |
| | ☐ | | 15:26:00 | 00:00:30 | 98170 | Artemis | ARTEMIS O SHOT REVISED | BROSCBREVJULHD |
| | ☐ | | 15:26:30 | 00:00:30 | 91551 | Good Feet Store (The) | GOOD FEET-PAIN FREE AND CC SPOT | GFS-0315-025HDR-LODICO 30 |
| | | | | | | FOLLOWING SEG. INCLUDES AND CC SPOT | | |
| | ☐ | | 15:27:00 | 00:07:57 | | THE DR. OZ SHOW Episode:6125-:Segment 3 | | |
| | | | | | | GROUP 00:03:00 Local Spots | | |
| | ☐ | | 15:34:57 | 00:00:15 | 92775 | E&J Gallo Winery | E&J GALLO WINES | GLTV5001000H |
| | ☐ | | 15:35:12 | 00:00:30 | 92978 | Cincinnati Toyota Dealers | TOYOTA | 21TCATV15121HBUYH |

| Aired | Air Time | Set Time | Length | Mat. ID | Advertiser/Location | Comments | ISCI |
|---|---|---|---|---|---|---|---|
| ☒ | ☐ | 15:34:57 | 00:00:15 | 92775 | E&J Gallo Winery | E&J GALLO WINES | GLTV5001000H |
| ☒ | ☐ | 15:35:12 | 00:00:30 | 92978 | Cincinnati Toyota Dealers | TOYOTA | 2TCATV1512IHBUYH |
| ☒ | ☐ | 15:35:42 | 00:00:30 | 90899 | Kisling, Nestico &Redick | KISLING NESTICO REDICK | KN0314-25 |
| ☒ | ☐ | 15:36:12 | 00:00:30 | 92730 | Safe Auto | SAFE AUTO-WHATEVER | SAFE0075000H |
| ☒ | ☐ | 15:36:42 | 00:00:30 | 91514 | K12 | K12 | CFKT301215H |
| | | JOSH-LAPTOPJosh started shift at 15:36:51 | | | | | |
| ☒ | ☐ | 15:37:12 | 00:00:30 | 92884 | Oglebay Park | OGLEBAY PARK | SPRING VALUES |
| ☒ | ☐ | 15:37:42 | 00:00:15 | 90745 | All American Pet Expo | PET EXPO WEEK OF | PET EXPO WEEK OF 15 |
| | | FOLLOWING SEGMENT 1:40 BARTER/1:30 LOCAL | | | | | |
| ☒ | ☐ | 15:37:57 | 00:09:52 | | THE DR. OZ SHOW Episode:6125-:Segment 4 | | |
| ☒ | ☐ | 15:47:49 | 00:00:30 | 55626 | DR PHIL WEDNESDAY 30 HD - TODAY | DR PHIL WEDNESDAY 30 HD - TODAY | |
| | | | | | GROUP 00:00:30 Local Spots | | |
| | | | | | GROUP 00:01:00 Local Spots | | |
| ☒ | ☐ | 15:48:19 | 00:00:30 | 92704 | Rite Rug | RITE RUG | TRITERUG1530H |
| ☒ | ☐ | 15:48:49 | 00:00:30 | 92097 | Restorative Health | RESTORATIVE HEALTH | ADM 5634 02 |
| | | THE FOLLOWING SEG. CONTAINS 2:30 BARTER AND BUMPER | | | | | |

*Fig. 8*

| Aired | Air Time | Set Time | Length | Mat. ID | Advertiser/Location | Comments | ISCI |
|---|---|---|---|---|---|---|---|
| ☒ | | 15:36:42 | 00:00:30 | 91514 | K12 | K12 | CFKT301215H |
| | | | | JOSH-LAPTOP Josh started shift at 15:36:51 | | | |
| ☒ | | 15:37:12 | 00:00:30 | 92884 | Oglebay Park | OGLEBAY PARK | SPRING VALUES |
| | | | | JOSH-LAPTOP Josh ended shift at 15:37:24 | | | |
| ☒ | | 15:37:42 | 00:00:15 | 90745 | All American Pet Expo | PET EXPO WEEK OF | PET EXPO WEEK OF 15 |
| | | | | FOLLOWING SEGMENT 1:40 BARTER/1:30 LOCAL | | | |
| ☒ | | 15:37:57 | 00:09:52 | | THE DR. OZ SHOW Episode:6125-:Segment 4 | | |
| | | | | GROUP 00:00:30 Local Spots | | | |
| ☒ | | 15:47:49 | 00:00:30 | 55626 | DR PHIL WEDNESDAY 30 HD - TODAY | DR PHIL WEDNESDAY 30 HD - TODAY | |
| | | | | GROUP 00:01:00 Local Spots | | | |
| ☒ | | 15:48:19 | 00:00:30 | 92704 | Rite Rug | RITE RUG | TRITERUG1530H |
| ☒ | | 15:48:49 | 00:00:30 | 92097 | Restorative Health | RESTORATIVE HEALTH | ADM 5634 02 |
| | | | | THE FOLLOWING SEG. CONTAINS 2:30 BARTER AND BUMPER AND ALSO SEGMENT 6 | | | |
| ☒ | | 15:49:19 | 00:09:07 | | THE DR. OZ SHOW Episode:13129- △Edit/Drop | | |

15:58:26 : 01:01:10 - DR. PHIL Episode:13129- △Edit/Drop

*Fig. 9*

| Aired | Air Time | Set Time | Length | Mat. ID | Advertiser/Location | Comments | ISCI |
|---|---|---|---|---|---|---|---|
| | | | | | Department | DEPT-CANCER SCREENINGS | |
| ☒ | | 15:14:10 | 00:00:30 | 92754 | General Auto Insurance | GENERAL AUTO INSURANCE | GEN-06145 |
| ☒ | | 15:14:40 | 00:00:30 | 91514 | K12 | K12 | CFKT301215H |
| | | | | | FOLLOWING SEGMENT INCLUDES FEE SPOTS | | |
| ☒ | | 15:15:10 | 00:08:50 | THE DR. OZ SHOW Episode:6125-:Segment 2 | | | |
| | | | | | GROUP 00:00:30 Local Spots | | |
| ☒ | | 15:24:00 | 00:00:30 | 55044 | COLUMBUS MAYORAL DEBATE 4/16 | | COLUMBUS MAYORAL DEBATE 4/16 |
| | | | | | GROUP 00:02:30 Local Spots | | |
| ☒ | | 15:24:30 | 00:00:30 | 91311 | Big Sandy Superstore | BIG SANDY | LMSSSTTHANKS62H |
| ☒ | | 15:25:00 | 00:00:30 | 91562 | Molina Health Care | MOLINA HEALTH CARE | OHRE-8230H |
| ☒ | | 15:25:30 | 00:00:30 | 96941 | O'Conner, Acciani & Levy | OCONNER ACCIANI & LEVY | PMP OCON 023H |
| ☒ | | 15:26:00 | 00:00:30 | 98170 | Artemis | ARTEMIS O SHOT REVISED | BROSCBREVJULHO |
| ☒ | | 15:26:30 | 00:00:30 | 91551 | Good Feet Store (The) | GOOD FEET-PAIN FREE | GFS-0315-025HDR-LODICO 30 |
| | | | | | FOLLOWING SEG. INCLUDES AND CC SPOT | | |
| ☒ | | 15:27:00 | 00:07:57 | THE DR. OZ SHOW Episode:6125-:Segment 3 | | | |

*Fig. 10*

| Aired | Air Time | Set Time | Length | Mat. ID | Advertiser/Location | Comments | ISCI |
|---|---|---|---|---|---|---|---|
| ☒ | | | | | FOLLOWING SEGMENT INCLUDES FEE SPOTS | | |
| ☒ | | 15:15:10 | 00:08:50 | | THE DR. OZ SHOW Episode:6125-:Segment 2 | | |
| | | | | | GROUP 00:00:30 Local Spots | | |
| ☒ | | 15:24:00 | 00:00:30 | 55044 | COLUMBUS MAYORAL DEBATE 4/16 | | COLUMBUS MAYORAL DEBATE 4/16 |
| | | | | | GROUP 00:02:30 Local Spots | | |
| ☒ | 15:26:30 | 15:24:30 | 00:00:30 | 91311 | Big Sandy Superstore | BIG SANDY | LMSBSTTHANKS62H |
| ☒ | 15:26:30 | 15:25:00 | 00:00:30 | 91562 | Molina Health Care | MOLINA HEALTH CARE | OHRE-8230H |
| ☒ | | 15:25:30 | 00:00:30 | 96941 | O'Conner, Accioni & Levy | OCONNER ACCIANI & LEVY | PMP OCON 023H |
| ☒ | | 15:26:00 | 00:00:30 | 98170 | Artemis | ARTEMIS O SHOT REVISED | BROSCBREVJULH0 |
| ☒ | | 15:26:30 | 00:00:30 | 91551 | Good Feet Store (The) | GOOD FEET-PAIN FREE | GFS-0315-025HDR-LODICO 30 |
| | | | | | FOLLOWING SEG. INCLUDES AND CC SPOT | | |
| ☒ | | 15:27:00 | 00:07:57 | | THE DR. OZ SHOW Episode:6125-:Segment 3 | | |
| | | | | | GROUP 00:03:00 Local Spots | | |
| ☒ | | 15:34:57 | 00:00:15 | 92775 | E&J Gallo Winery | E&J GALLO WINES | GLTV5001000H |
| ☒ | | 15:35:12 | 00:00:30 | 92978 | Cincinnati Toyota Dealers | TOYOTA | 2TCATV15121HBUYH |
| ☒ | | 15:35:42 | 00:00:30 | 90899 | Kisling, Nestico &Redick | KISLING NESTICO REDICK | KN0314-25 |

*Fig. 12*

| Aired | Air Time | Set Time | Length | Mat. ID | Advertiser/Location | Comments | ISCI |
|---|---|---|---|---|---|---|---|
| | | | | | FOLLOWING SEGMENT INCLUDES FEE SPOTS | | |
| ☑ | | 15:15:10 | 00:08:50 | | THE DR. OZ SHOW Episode:6125-:Segment 2 | | |
| | | | | | GROUP 00:00:30 Local Spots | | |
| ☑ | | 15:24:00 | 00:00:30 | 55044 | COLUMBUS MAYORAL DEBATE 4/16 | | COLUMBUS MAYORAL DEBATE 4/16 |
| | | | | | GROUP 00:02:30 Local Spots | | |
| ☑ | | 15:24:30 | 00:00:30 | 91311 | Big Sandy Superstore | BIG SANDY | LMSBSTTHANKS62H |
| ☑ | 15:26:30 | 15:25:00 | 00:00:30 | 91562 | Molina Health Care | MOLINA HEALTH CARE | OHRE-8230H |
| ☑ | 15:26:30 | 15:25:30 | 00:00:30 | 96941 | O'Conner, Acciani & Levy | OCONNER ACCIANI & LEVY | PMP OCON 023H |
| ☑ | | 15:26:00 | 00:00:30 | 98170 | Artemis | ARTEMIS O SHOT REVISED | BROSCBREVJULH0 |
| ☑ | | 15:26:30 | 00:00:30 | 91551 | Good Feet Store (The) | GOOD FEET-PAIN FREE | GFS-0315-025HDR-LODICO 30 |
| | | | | | FOLLOWING SEG. INCLUDES AND CC SPOT | | |
| ☑ | | 15:27:00 | 00:07:57 | | THE DR. OZ SHOW Episode:6125-:Segment 3 | | |
| | | | | | GROUP 00:03:00 Local Spots | | |
| ☑ | | 15:34:57 | 00:00:15 | 92775 | E&J Gallo Winery | E&J GALLO WINES | GLTV5001000H |
| ☑ | | 15:35:12 | 00:00:30 | 92978 | Cincinnati Toyota Dealers | TOYOTA | 2TCATV15121HBUYH |

Fig. 13

| Aired | Air Time | Set Time | Length | Mat. ID | Advertiser/Location | Comments | ISCI |
|---|---|---|---|---|---|---|---|
| ⊘ | | 15:13:40 | 00:00:30 | 92037 | Licking County Health Department | LICKING CO HEALTH DEPT-CANCER SCREENINGS | BCCP0315 |
| ⊘ | | 15:14:10 | 00:00:30 | 92754 | General Auto Insurance | GENERAL AUTO INSURANCE | GEN-06145 |
| ⊘ | | 15:14:40 | 00:00:30 | 91514 | K12 | K12 | CFKT301215H |
| | | | | | FOLLOWING SEGMENT INCLUDES FEE SPOTS | | |
| ⊘ | | 15:15:10 | 00:08:50 | | THE DR. OZ SHOW Episode:6125-:Segment 2 | | |
| | | | | | GROUP 00:03:00 Local Spots | | |
| ⊘ | | 12:24:00 | 00:00:30 | 55044 | COLUMBUS MAYORAL DEBATE 4/16 | COLUMBUS MAYORAL DEBATE 4/16 | |
| | | | | | GROUP 00:02:30 Local Spots | | |
| ⊘ | | 15:24:30 | 00:00:30 | 91311 | Big Sandy Superstore | BIG SANDY | LMSSSTTHANKS62H |
| ⊘ | | 15:25:00 | 00:00:30 | 91562 | Molina Health Care | MOLINA HEALTH CARE | OHRE-8230H |
| ⊘ | | 15:25:30 | 00:00:30 | 96941 | O'Conner, Acciani & Levy | OCONNER ACCIANI & LEVY | PMP OCON 023H |
| ⊘ | | 15:26:00 | 00:00:30 | 98170 | Artemis | ARTEMIS O SHOT REVISED | BROSCBREVJULHO |
| ⊘ | | 15:26:30 | 00:00:30 | 91551 | Good Feet Store (The) | GOOD FEET-PAIN FREE | GFS-0315-025HOR-LOGICO 30 |

Details | Orphans | Bins ▽

96941-O'CONNER, ACCIANI & LEVY
ISCI-PMP OCON 023H
Length 00:00:30

*Fig. 14*

| Aired | Air Time | Set Time | Length | Mat. ID | Advertiser/Location | Comments | ISCI |
|---|---|---|---|---|---|---|---|
| ⊘ | | 15:00:00 | 00:12:10 | | THE DR. OZ SHOW Episode:6125-:Segment 1 | | |
| | | | | | GROUP 00:00:30 Local Spots | | |
| ⊘ | | 15:12:10 | 00:00:30 | 55041 | C2BF-APRIL IMAGE 30 | | C2BF-APRIL IMAGE 30 |
| | | | | | GROUP 00:02:30 Local Spots | | |
| ⊘ | | 15:12:40 | 00:00:30 | 92984 | Cincinnati Toyota Dealers | TOYOTA | 2TCATV1513IHBUYH |
| ⊘ | | 15:13:10 | 00:00:30 | 92097 | Restorative Health | RESTORATIVE HEALTH | ADM 5634 02 |
| ⊘ | | 15:13:40 | 00:00:30 | 92037 | Licking County Health Department | LICKING CO HEALTH DEPT-CANCER SCREENINGS | BCCP0315 |
| ⊘ | | 15:14:10 | 00:00:30 | 92754 | General Auto Insurance | GENERAL AUTO INSURANCE | GEN-06145 |
| ⊘ | | 15:14:40 | 00:00:30 | 91514 | K12 | K12 | CFKT301215H |
| | | | | | FOLLOWING SEGMENT INCLUDES FEE SPOTS | | |
| ⊘ | | 15:15:10 | 00:08:50 | | THE DR. OZ SHOW Episode:6125-:Segment 2 | | |
| | | | | | GROUP 00:03:00 Local Spots | | |
| ⊘ | | 12:24:00 | 00:00:30 | 55044 | COLUMBUS MAYORAL DEBATE 4/16 | | COLUMBUS MAYORAL DEBATE 4/16 |
| | | | | | GROUP 00:02:30 Local Spots | | |
| ⊘ | | 15:24:30 | 00:00:30 | 91311 | Big Sandy Superstore | BIG SANDY | LMSSSTTHANKS62H |
| ⊘ | | 15:25:00 | 00:00:30 | 91562 | Molina Health Care | MOLINA HEALTH CARE | OHRE-8230H |

Details | Orphans ① | Bins ▽

Cincinnati Toyota Dealers
☑ Edit Spot
⧉ Copy to New Spot Bin
Contract # 127373 4
⊙ Air Times:
   3:00 pm-3:55 pm
☐ NOTES:

[⊕ Add Note]

User: JOSH LAPTOP/JOSH
Created 15:10:00-04/15

[☐ Save] [☐ Delete]

*Fig. 15*

| Aired | Air Time | Set Time | Length | Mat. ID | Advertiser/Location | Comments | ISCI |
|---|---|---|---|---|---|---|---|
| ⊘ | | 12:59:56 | 00:00:00 | 91611 | Ricart Automotive | RICART | RH041015MBNSHO |
| ⊘ | 15:00:00 : 00:58:26--THE DR. OZ SHOW Episode: 6125- (△ Edit/Drop) | | | | | | |
| ⊘ | | 15:00:00 | 00:12:10 | | THE DR. OZ SHOW Episode:6125-:Segment 1 | | |
| | | | | | GROUP 00:00:30 Local Spots | | |
| ⊘ | | 15:12:10 | 00:00:30 | 55041 | C2BF-APRIL IMAGE 30 | | C2BF-APRIL IMAGE 30 |
| | | | | | GROUP 00:02:30 Local Spots | | |
| ⊘ | | 15:12:40 | 00:00:30 | 92984 | Cincinnati Toyota Dealers | TOYOTA | 2TCATV1513IHBUYH |
| ⊘ | | 15:13:10 | 00:00:30 | 92097 | Restorative Health | RESTORATIVE HEALTH | ADM 5634 02 |
| ⊘ | | 15:13:40 | 00:00:30 | 92037 | Licking County Health Department | LICKING CO HEALTH DEPT-CANCER SCREENINGS | BCCP0315 |
| ⊘ | | 15:14:10 | 00:00:30 | 92754 | General Auto Insurance | GENERAL AUTO INSURANCE | GEN-06145 |
| ⊘ | | 15:14:40 | 00:00:30 | 91514 | K12 | K12 | CFKT301215H |
| | | | | | FOLLOWING SEGMENT INCLUDES FEE SPOTS | | |
| ⊘ | | 15:15:10 | 00:08:50 | | THE DR. OZ SHOW Episode:6125-:Segment 2 | | |
| | | | | | GROUP 00:03:00 Local Spots | | |
| ⊘ | | 12:24:00 | 00:00:30 | 55044 | COLUMBUS MAYORAL DEBATE 4/16 | | COLUMBUS MAYORAL DEBATE 4/16 |

Details | Orphans ① | Bins ▷

C2BF-APRIL IMAGE 30
☑ Edit Spot
☐ Copy to New Spot Bin
Contract # 1.1
⏱ Air Times:
NONE
☐ NOTES:

⊕ Add Note ewetestsets
User: JOSH LAPTOP/JOSH
Created 15:10:00-04/15

*Fig. 16*

| Aired Air Time | Set Time | Length | Mat. ID | Advertiser/Location | Comments | ISCI |
|---|---|---|---|---|---|---|
| | 15:00:00 | 00:12:10 | | THE DR. OZ SHOW Episode:6125-:Segment 1 | | |
| | | | | GROUP 00:00:30 Local Spots | | |
| | 15:12:10 | 00:00:30 | 55041 | C2BF-APRIL IMAGE 30 | | C2BF-APRIL IMAGE 30 |
| | | | | GROUP 00:02:30 Local Spots | | |
| | 15:12:40 | 00:00:30 | 92984 | Cincinnati Toyota Dealers | TOYOTA | 2TCATV1513IHBUYH |
| | 15:13:10 | 00:00:30 | 92097 | Restorative Health | RESTORATIVE HEALTH | ADM 5634 02 |
| | 15:13:40 | 00:00:30 | 92037 | Licking County Health Department | LICKING CO HEALTH DEPT-CANCER SCREENINGS | BCCP0315 |
| | 15:14:10 | 00:00:30 | 92754 | General Auto Insurance | GENERAL AUTO INSURANCE | GEN-06145 |
| | 15:14:40 | 00:00:30 | 91514 | K12 | K12 | CFKT301215H |
| | 15:15:10 | 00:08:50 | | THE DR. OZ SHOW Episode:6125-:Segment 2 FOLLOWING SEGMENT INCLUDES FEE SPOTS | | |
| | | | | GROUP 00:03:00 Local Spots | | |
| | 12:24:00 | 00:00:30 | 55044 | COLUMBUS MAYORAL DEBATE 4/16 | | COLUMBUS MAYORAL DEBATE 4/16 |
| | | | | GROUP 00:02:30 Local Spots | | |
| | 15:24:30 | 00:00:30 | 91311 | Big Sandy Superstore | BIG SANDY | LMSSSTTHANKS62H |
| | 15:25:00 | 00:00:30 | 91562 | Molina Health Care | MOLINA HEALTH CARE | OHRE-8230H |

*Fig. 17*

| Aired Air Time | Set Time | Length | Mat. ID | Advertiser/Location | Comments | ISCI |
|---|---|---|---|---|---|---|
| ⊘ | 12:59:56 | 00:00:00 | 91611 | Ricart Automotive | RICART | RH04101SMBNSHO |
| 15:00:00 : 00:58:26 -- THE DR. OZ SHOW Episode: 6125- △Edit/Drop | | | | | | |
| ⊘ | 15:00:00 | 00:12:10 | | THE DR. OZ SHOW Episode:6125-:Segment 1 | | |
| | | | | GROUP 00:00:30 Local Spots | | |
| ⊘ | 15:12:10 | 00:00:30 | 55041 | C2BF-APRIL IMAGE 30 | | C2BF-APRIL IMAGE 30 |
| | | | | GROUP 00:02:30 Local Spots | | |
| ⊘ | 15:12:40 | 00:00:30 | 92984 | Cincinnati Toyota Dealers | TOYOTA | 2TCATV1513IHBUYH |
| ⊘ | 15:13:10 | 00:00:30 | 92097 | Restorative Health | RESTORATIVE HEALTH | ADM 5634 02 |
| ⊘ | 15:13:40 | 00:00:30 | 92037 | Licking County Health Department | LICKING CO HEALTH DEPT-CANCER SCREENINGS | BCCP0315 |
| ⊘ | 15:14:10 | 00:00:30 | 92754 | General Auto Insurance | GENERAL AUTO INSURANCE | GEN-06145 |
| ⊘ | 15:14:40 | 00:00:30 | 91514 | K12 | K12 | CFKT301215H |
| | | | | FOLLOWING SEGMENT INCLUDES FEE SPOTS | | |
| ⊘ | 15:15:10 | 00:08:50 | 55044 | THE DR. OZ SHOW Episode:6125-:Segment 2 | | |
| | | | | GROUP 00:03:00 Local Spots | | |
| ⊘ | 12:24:00 | 00:00:30 | 55044 | COLUMBUS MAYORAL DEBATE 4/16 | | COLUMBUS MAYORAL DEBATE 4/16 |

Details | Orphans (6) | Bins ▷

Edit Multiple Spots
☐ NOTES:
(+ Add Note)

all these spots didn't air!

(☐ Save) (☐ Delete)
User: JOSH LAPTOP/JOSH
Created 15:40:41-04/15 the spot wasn't loaded correctly
User: JOSH LAPTOP/JOSH
Created 15:40:00-04/15

*Fig. 18*

| | Aired | Air Time | Set Time | Length | Mat. ID | Advertiser/Location | Comments | ISCI |
|---|---|---|---|---|---|---|---|---|
| | | | | | | GROUP 00:00:05 Local Spots | | |
| ⊘ | | | 17:07:51 | 00:00:15 | 91155 | Miller Furniture | MILLER FURNITURE | MF-APRIL-15-TV-15 |
| | | | | | | GROUP 00:01:00 Local Spots | | |
| ⊘ | | | 17:08:06 | 00:00:30 | 92097 | Restorative Health | RESTORATIVE HEALTH | ADM 5634 02 |
| ⊘ | | | 17:08:36 | 00:00:15 | 90954 | Buckeye Honda | BUCKEYE HONDA | BUH-174-APRIL-ACCORD |
| | | | | | | GROUP 00:00:35 Local Spots | | |
| ⊘ | | | 17:08:51 | 00:00:30 | 91390 | Eye Mart Express | EYE MART EXPRESS- ALL TOGETHER | ATLS3976OFEME |
| ⊘ | | | 17:09:21 | 00:00:05 | 90655 | Eye Mart Express | EYE MART-10TV NEWS | EYEMARTBB1505 |
| | | | 17:09:26 | 00:02:18 | | 10TV NEWS @ 5PM: Segment 2 | | |
| | | | | | | GROUP 00:00:30 Local Spots | | |
| ⊘ | | | 17:11:44 | 00:00:30 | 55041 | C2BF-APRIL IMAGE 30 | C2BF-APRIL IMAGE 30 | |
| | | | | | | GROUP 00:02:00 Local Spots | | |
| ⊘ | | | 17:12:14 | 00:00:15 | 90301 | Feazel Roofing | FEAZEL ROOFING | FR-15040BH015-WRRNTY |
| ⊘ | | | 17:12:15 | 00:00:15 | 90954 | Buckeye Honda | BUCKEYE HONDA | FR-15040BH015-WRRNTY |
| ⊘ | | | 17:12:29 | 00:00:30 | 91754 | Kroger | KROGER-WEEKLY SPECIALS | XQME2644H |
| ⊘ | | | 17:12:59 | 00:00:30 | 90047 | Auto Mall/Hatfield | HATFIELD-SUBARU | SUB-TV-APR15 |

Details | Orphans (33) | Bins ▽

Buckeye Honda
☑ Edit Spot
☐ Copy to New Spot Bin
Contract # 128066 12
⊙ Air Times:
5:00pm - 6:00pm
☐ NOTES:

⊕ Add Note

Tried to make good on
April 15, @ 17:12:15
User: JOSH LAPTOP/JOSH
Created 15:10:00-04/15

*Fig. 19*

Edit Spot

Name: Miller Furniture 0 future spots with matching Mat. IDs

Length: 00:00:15

Material ID: 91155

Comments: MILLER FURNITURE

ISCI: MF-APRIL-15-TV-15

Save Changes For:
- ● This Spot Only
- ○ All Future Spots

[Save] [Cancel]

Fig. 20

| Aired | Air Time | Set Time | Length | Mat. ID | Advertiser/Location | Comments | ISCI |
|---|---|---|---|---|---|---|---|
| | | | | | GROUP 00:00:05 Local Spots | | |
| ⊘ | | 17:07:51 | 00:00:15 | 91155 | Miller Furniture | MILLER FURNITURE | MF-APRIL-15-TV-15 |
| | | | | | GROUP 00:01:00 Local Spots | | |
| ⊘ | | 17:08:06 | 00:00:30 | 92097 | Restorative Health | RESTORATIVE HEALTH | ADM 5634 02 |
| ⊘ | | 17:08:36 | 00:00:15 | 90954 | Buckeye Honda | BUCKEYE HONDA | BUH-174-APRIL-ACCORD |
| | | | | | GROUP 00:00:35 Local Spots | | |
| ⊘ | | 17:08:51 | 00:00:30 | 91390 | Eye Mart Express | EYE MART EXPRESS-ALL TOGETHER | ATLS3976DFEME |
| ⊘ | | 17:09:21 | 00:00:05 | 90655 | Eye Mart Express | EYE MART-10TV NEWS | EYEMARTBB1505 |
| ⊘ | | 17:09:26 | 00:02:18 | | 10TV NEWS @ 5PM: Segment 2 | | |
| ⊘ | | 17:11:44 | 00:00:30 | 55041 | C2BF-APRIL IMAGE 30 | | C2BF-APRIL IMAGE 30 |
| | | | | | GROUP 00:00:30 Local Spots | | |
| | | | | | GROUP 00:02:00 Local Spots | | |
| ⊘ | | 17:12:14 | 00:00:15 | 90301 | Feazel Roofing | FEAZEL ROOFING | FR-150408HD15-WRRNTY |
| ⊘ | | 17:12:15 | 00:00:15 | 90954 | Buckeye Honda | BUCKEYE HONDA | FR-150408HD15-WRRNTY |
| ⊘ | | 17:12:29 | 00:00:30 | 91754 | Kroger | KROGER-WEEKLY SPECIALS | XQME2644H |
| ⊘ | | 17:12:59 | 00:00:30 | 90047 | Auto Mall/Hatfield | HATFIELD-SUBARU | SUB-TV-APR15 |

Details | Orphans (13) | Bins ▽

Trash Bin

92825--Columbus Metro Parks
ISCI C2BF-APRIL-IMAGE
Length: 00:00:30
Original Set Time: 17:08:52

*Fig. 21*

Create Spot/Segment

Name:

Type of Spot:
- ● Spot
- ○ Segment / Cut-in

Length:
00:00:00

Material ID:

Comments:

ISCI:

[Save] [Cancel]

Fig. 22

| Details | Orphans (33) | Bins ▷ | | | | | |
|---|---|---|---|---|---|---|---|
| Promos/IDs | | | | | | | |

SELECT PROMO LENGTH:
- Select ▷
- Select
- 03
- 04
- 05
- 06
- 07
- 08
- 09
- 10
- 15
- 20
- 30

| Aired Air Time | Set Time | Length | Mat. ID | Advertiser/Location | Comments | ISCI |
|---|---|---|---|---|---|---|
| ☒ | 17:08:36 | 00:00:15 | 90954 | Buckeye Honda | BUCKEYE HONDA | BUH-174-APRIL-ACCORD |
| ☒ | 17:08:51 | 00:00:30 | 91391 | Eye Mart Express | EYE MART EXPRESS-ALL TOGETHER | ATLS3976OFEMF |
| | | | | GROUP 00:00:35 Local Spots | | |
| ☒ | 17:09:21 | 00:00:05 | 90655 | Eye Mart Express | EYE MART-10TV NEWS | EYEMARTBB1505 |
| ☒ | 17:09:26 | 00:02:18 | | 10TV NEWS @ 5PM: Segment 2 | | |
| ☒ | 17:11:44 | 00:00:30 | 55041 | C2BF-APRIL IMAGE 30 | | C2BF-APRIL IMAGE 30 |
| | | | | GROUP 00:00:30 Local Spots | | |
| | | | | GROUP 00:02:00 Local Spots | | |
| ☒ | 17:12:14 | 00:00:15 | 90301 | Feazel Roofing | FEAZEL ROOFING | FR-150408HD15-WRRNTY |
| ☒ | 17:12:15 | 00:00:15 | 90954 | Buckeye Honda | BUCKEYE HONDA | FR-150408HD15-WRRNTY |
| ☒ | 17:12:29 | 00:00:30 | 91754 | Kroger | KROGER-WEEKLY SPECIALS | XOME2644H |
| ☒ | 17:12:59 | 00:00:30 | 90047 | Auto Mall/Hatfield | HATFIELD-SUBARU | SUB-TV-APR15 |
| ☒ | 17:13:29 | 00:00:30 | 91725 | American Signature Furniture | AMERICAN SIGNATURE/VALUE CITY | VALUE15421GE-H |
| ☒ | 17:13:59 | 00:00:15 | 93065 | Tire Discounters c/o Highland Advertising | TIRE DISCOUNTERS-FREE ALIGNMENT | TD-0315-15-01 |
| ☒ | 17:14:14 | 00:00:05 | 91676 | Carr Supply | purge!!!!!!!!!!! | CLASSICAIRSKYBB1305-R1 |

Fig. 23

| Details | Orphans ③ Bins ▷ | | | | | | |
|---|---|---|---|---|---|---|---|
| Promos/IDs | Aired | Air Time | Set Time | Length | Mat. ID | Advertiser/Location | Comments | ISCI |
| | ⊘ | | 17:08:36 | 00:00:15 | 90954 | Buckeye Honda | BUCKEYE HONDA | BUH-174-APRIL-ACCORD |
| SELECT PROMO LENGTH: | ⊘ | | 17:08:51 | 00:00:30 | 91391 | Eye Mart Express | EYE MART EXPRESS-ALL TOGETHER | ATLS3976OFEMF |
| Select ▷ | | | | | GROUP 00:00:35 Local Spots | | | |
| | ⊘ | | 17:09:21 | 00:00:05 | 90655 | Eye Mart Express | EYE MART-10TV NEWS | EYEMART10TVBB1505 |
| 55401--CONL Breaking News Length: 00:00:15 | ⊘ | | 17:09:26 | 00:02:18 | | 10TV NEWS @ 5PM: Segment 2 | | |
| 55761--Doppler 10 Winter Weather Image Length: 00:00:15 | ⊘ | | 17:11:44 | 00:00:30 | 55041 | C2BF-APRIL IMAGE 30 | | C2BF-APRIL IMAGE 30 |
| | | | | | GROUP 00:00:30 Local Spots | | | |
| | | | | | GROUP 00:02:00 Local Spots | | | |
| 55420--Doppler 10 Winter Radar Length: 00:00:15 | ⊘ | | 17:12:14 | 00:00:15 | 90301 | Feazel Roofing | FEAZEL ROOFING | FR-150408HD15-WRRNTY |
| | ⊘ | | 17:12:15 | 00:00:15 | 90954 | Buckeye Honda | BUCKEYE HONDA | FR-150408HD15-WRRNTY |
| 55107--Columbus CEO Awards Length: 00:00:15 | ⊘ | | 17:12:29 | 00:00:30 | 91754 | Kroger | KROGER-WEEKLY SPECIALS | XQME2644H |
| | ⊘ | | 17:12:59 | 00:00:30 | 90047 | Auto Mall/Hatfield | HATFIELD-SUBARU | SUB-TV-APR15 |
| | ⊘ | | 17:13:29 | 00:00:30 | 91725 | American Signature Furniture | AMERICAN SIGNATURE/VALUE CITY | VALUE15421GE-H |
| | ⊘ | | 17:13:59 | 00:00:15 | 93065 | Tire Discounters c/o Highland Advertising | TIRE DISCOUNTERS-FREE ALIGNMENT | TD-0315-15-01 |
| | ⊘ | | 17:14:14 | 00:00:05 | 91676 | Carr Supply | purge!!!!!!!!!!!! | CLASSICAIRSKYBB1305-R1 |

Fig. 24

| Spot Details | ☒ |
|---|---|

Restorative Health

Original Air Time:
`15:13:10`

Length:
`00:00:30`

Contract #:
`426478.32.1`

Cart #:
`92097`

ISCI:
`ADM 5634 02`

Air Times:
`3:00 pm - 3:55 pm`

Notes:
`•all these spots did't air`

*JOSH-LAPTOPJosh -- April 15   3:40PM*

[ Close ]

*Fig. 25*

```
15:00:00 -- THE DR. OZ SHOW Episode: 6125-
    15:12:10--C2BF-APRIL IMAGE 30--MediaID:55041
     •ewetestsets--JOSH-LAPTOPJosh@15:40:21
    15:12:40--Cincinnati Toyota Dealers--MediaID:92984
     •the spot wasn't loaded correctly--JOSH-LAPTOPJosh@15:40:00
     •all these spots didn't air--JOSH-LAPTOPJosh@15:41:00
     •tried to make good on April 15@15:58:57-JOSH-LAPTOPJosh@15:42:25
    15:13:10--Restorative Health--MediaID:92097
     "Did Not Air"
     •all these spots didn't air--JOSH-LAPTOPJosh@15:40:49
    15:13:40--Licking County Health Department--MediaID:92037
     "Did Not Air"
     •all these spots didn't air--JOSH-LAPTOPJosh@15:40:49
    15:14:10--General Auto Insurance--MediaID:92754
     "Did Not Air"
     •all these spots didn't air--JOSH-LAPTOPJosh@15:40:49
    15:14:10--General Auto Insurance--MediaID:92754
     "Did Not Air"
     •all these spots didn't air--JOSH-LAPTOPJosh@15:40:49
    15:40:40--K 12--MediaID:91514
    15:25:30--O'Conner, Acciani & Levy--MediaID:96941
     "Did Not Air"
15:28:26--Breaking news
    •[DR. PHIL Episode: 13129-] dropped and changed to [Breaking news-- JOSH-LAPTOPJosh@15:42:05
    15:28:26--Ohio University--MediaID:99046
     "Did Not Air"
    15:58:56--Molina Health Care--MediaID:91599
     "Did Not Air"
```

Fig. 26

```
Discrep Reports
         ⬆ Wed - 04/15 ⬇
                         ▽ Show Spots 15:28:26--Breaking news
[DR. PHIL Episode: 13129-] dropped and changed to [Breaking news-- JOSH-LAPTOPJosh@15:42:05
16:00:00 -- DR. PHIL Episode: 13129-: Segment 1
          "Did Not Air"
16:11:51 -- DR. PHIL Episode: 13129-: Segment 2
          "Did Not Air"
16:22:21 -- DR. PHIL Episode: 13129-: Segment 3
          "Did Not Air"
16:28:51 -- DR. PHIL Episode: 13129-: Segment 4
          "Did Not Air"
16:38:41 -- DR. PHIL Episode: 13129-: Segment 5
          "Did Not Air"
16:46:40 -- DR. PHIL Episode: 13129-: Segment 6
          "Did Not Air"
16:55:40 -- DR. PHIL Episode: 13129-: Segment 7
          "Did Not Air"
```

*Fig. 27*

| Show | Actual Start | Actual End |
|---|---|---|
| THE TALK | → 15:05:00 | 15:05:00 |
| THE DR. OZ SHOW Episode: 6125- | | |

Delayed & Overrun Shows
Wed - 04/15

*Fig. 28*

| I-770 ▽ | ⌂ WBNS ▽ | | 🗓 04/15 | ⌕ Logged in: JOSH-LAPTOP/Josh |
|---|---|---|---|---|
| | 07:00:00 AM | CBS THIS MORNING 7AM | | |
| | 08:00:00 AM | CBS THIS MORNING 8AM | | |
| | 09:00:00 AM | LIVE WITH KELLY AND MICHAEL | | |
| | 10:00:00 AM | LET'S MAKE A DEAL | | |
| | 11:00:00 AM | PRICE IS RIGHT | | |
| | 11:59:46 AM | 10TV NEWS @ NOON | | |
| | 12:30:00 PM | YOUNG AND RESTLESS | | |
| | 01:30:00 PM | THE BOLD AND THE BEAUTIFUL | | |
| | 02:00:00 PM | THE TALK | | |
| | 03:00:00 PM | THE DR. OZ SHOW Episode: 6125- | | |
| | 04:27:52 PM | Breaking news | | |
| | 04:59:36 PM | 10TV NEWS @ 5PM | | |
| | 05:59:30 PM | 10TV NEWS @ 6PM | | |
| | 06:30:00 PM | CBS EVENING NEWS | | |
| | 07:00:06 PM | JEOPARDY | | |
| | 11:59:46 AM | 10TV NEWS @ NOON | | |
| | 12:30:00 PM | YOUNG AND RESTLESS | | |
| | 01:30:00 PM | THE BOLD AND THE BEAUTIFUL | | |
| | 02:00:00 PM | THE TALK | | |
| | 03:00:00 PM | THE DR. OZ SHOW Episode: 6125- | | |
| | 04:27:52 PM | Breaking news | | |
| | 04:59:36 PM | 10TV NEWS @ 5PM | | |
| | 05:59:30 PM | 10TV NEWS @ 6PM | | |
| | 06:30:00 PM | CBS EVENING NEWS | | |
| | 07:00:06 PM | JEOPARDY Episode: 6798- | | |
| | 07:30:56 PM | WHEEL OF FORTUNE: 6198- | | |
| | 08:00:00 PM | SURVIVOR | | |

*Fig. 29*

News Break Times

⬇ Wed - 04/15 ⬆

| Scheduled | Show |
|---|---|
| 04:25:00AM | 10TV NEWS @ 4:30AM |
| 04:25:00-- | 10TV NEWS @ 4:30AM: Segment 1 |
| 04:28:00-- | Break-00:01:30 |
| 04:29:30-- | 10TV NEWS @ 4:30AM: Segment 2 |
| 04:35:30-- | Break-00:03:00 |
| 04:38:30-- | 10TV NEWS @ 4:30AM: Segment 3 |
| 04:42:30-- | Break-00:02:30 |
| 04:45:00-- | 10TV NEWS @ 4:30AM: Segment 4 |
| 04:53:00-- | Break-00:03:00 |
| 04:56:00-- | 10TV NEWS @ 4:30AM: Segment 5 |
| 04:59:30AM | 10TV NEWS @ 5AM |
| 04:59:30-- | 10TV NEWS @ 5AM: Segment 1 |
| 05:04:21-- | Break-00:03:10 |
| 05:07:31-- | 10TV NEWS @ 5AM: Segment 2 |
| 05:12:25-- | Break-00:02:30 |
| 05:14:55-- | 10TV NEWS @ 5AM: Segment 3 |
| 05:19:50-- | Break-00:02:40 |

Fig. 30

SYSTEMS AND METHODS FOR EFFICIENTLY CHRONICLING BROADCAST CONTENT

CROSS-REFERENCE TO RELATED APPLICATIONS

This application claims priority to U.S. Provisional Application No. 62/025,550, filed Jul. 17, 2014, entitled "Systems and Methods for Scheduling Commercial Spots for a Television Broadcast," the entirety of which is herein incorporated by reference.

TECHNICAL FIELD

The technology described herein relates generally to television and radio broadcasting and more particularly to automated logging of broadcasted content.

BACKGROUND

The Federal Communications Commission (FCC) in the United States and similar organizations in other nations place certain logging requirements on radio, television, and other broadcasters. Those requirements demand that the broadcaster track which programming (e.g., content programming, advertisement programming, and promotional programming) is broadcast via its medium and the timing of that broadcasting. Such governing organizations may require the storage of programming information for a specified period of time (e.g., 7 years).

SUMMARY

Systems and methods are provided for automatically capturing event occurrence data associated with a broadcast channel. A baseline schedule for the broadcast channel is imported that includes an identification of events scheduled to appear on the broadcast channel and scheduled times for those events. A prompt is provided via a graphical user interface for a user to enter a time of actual occurrence of event appearances on the broadcast channel. Indications of times of an appearance and that events did not air on the broadcast channel are received via the prompt. The indications are stored in a computer-readable medium, and a report is provided that identifies events that did appear on the broadcast channel and their time of appearance and events that did not appear on the broadcast channel.

As another example, a system for automatically capturing event occurrence data associated with a broadcast channel includes a processing system having one or more data processor. A computer-readable medium is encoded with instructions for commanding the processing system to execute steps of a method. In the method, a baseline schedule for the broadcast channel is imported that includes an identification of events scheduled to appear on the broadcast channel and scheduled times for those events. A prompt is provided via a graphical user interface for a user to enter a time of actual occurrence of event appearances on the broadcast channel. Indications of times of an appearance and that events did not air on the broadcast channel are received via the prompt. The indications are stored in a computer-readable medium, and a report is provided that identifies events that did appear on the broadcast channel and their time of appearance and events that did not appear on the broadcast channel.

As a further example, a computer-readable medium is encoded with instructions for commanding one or more data processors to execute steps of a method for automatically capturing event occurrence data associated with a broadcast channel. A baseline schedule for the broadcast channel is imported that includes an identification of events scheduled to appear on the broadcast channel and scheduled times for those events. A prompt is provided via a graphical user interface for a user to enter a time of actual occurrence of event appearances on the broadcast channel. Indications of times of an appearance and that events did not air on the broadcast channel are received via the prompt. The indications are stored in a computer-readable medium, and a report is provided that identifies events that did appear on the broadcast channel and their time of appearance and events that did not appear on the broadcast channel.

BRIEF DESCRIPTION OF THE FIGURES

FIG. 3 is a diagram depicting a user interface provided prior to importing a baseline schedule.

FIG. 4 is a diagram depicting an example baseline schedule that can be imported by a broadcast channel event monitor.

FIG. 5 is a diagram depicting a portion of an imported schedule ready for editing or receipt of event indications.

FIG. 6 is a diagram depicting highlighting of a commercial item for potential editing or entry of event indication data.

FIG. 7 depicts highlighting of a promotional item.

FIG. 8 depicts a note associated with a start of a human operator shift.

FIG. 9 depicts notes associated with both the start and end of a human operator shift.

FIG. 10 depicts notes indicating types of content scheduled to appear in a following portion of programming.

FIGS. 12-14 are diagrams depicting example orphan bin operations.

FIGS. 15-19 depict user interfaces associated with appending notes to broadcast events.

FIG. 20 depicts a user interface for otherwise editing an event.

FIG. 21 depicts a trash bin for temporary storage of events provisionally identified as deleted.

FIG. 22 is a user interface provided for event creation.

FIG. 23 depicts a promotional event search.

FIG. 24 depicts a result list for the search of FIG. 23.

FIGS. 25-31 depict sample reports that can be provided based on schedule data and event airing indications.

DETAILED DESCRIPTION

Systems and methods as described herein, in one embodiment, provide mechanisms for capturing and storing event occurrence data associated with a broadcast channel. Such stored data can be provided to governing organizations to show compliance with necessary regulations. Such stored data can also be used for billing purposes, such as to bill advertisers for advertisements that are broadcast in accordance with their contract (e.g., at a proper day and time as specified by a contract between the advertiser and the broadcaster).

In certain instances, regulators or other parties (e.g., advertisers) may require that such channel broadcast logging be performed with the attention of a human operator, putting such an operator in the loop. That human operator may take necessary actions to make sure a log of the programming broadcasted over a channel matches the programming that actually was broadcast. In one example, the human operator enters a date or time associated with a portion of content that indicates when that portion of content was broadcast. In another example, the human operator observes the program content that is broadcast over the channel and an automatically generated log file to ensure a match.

While less complex during normal operations, where programming is broadcast according to its preidentified schedule, the process of monitoring a broadcast channel log operation becomes substantially more complex when things do not go as planned. Such deviations from an original schedule can occur frequently in certain environments, such as stations that broadcast programming associated with news (e.g., local, national, global), weather, or sporting events. Because of the unpredictable timing of special events (e.g., emergency weather situations, special report news stories), the programming schedules on those channels could change hours or minutes before actual airing or in some cases in real time. Where broadcasted programming deviates from the schedule, accurate logging is important, as the broadcasting of programming cannot be reconstructed at a later time using the baseline schedule.

Figure 1:
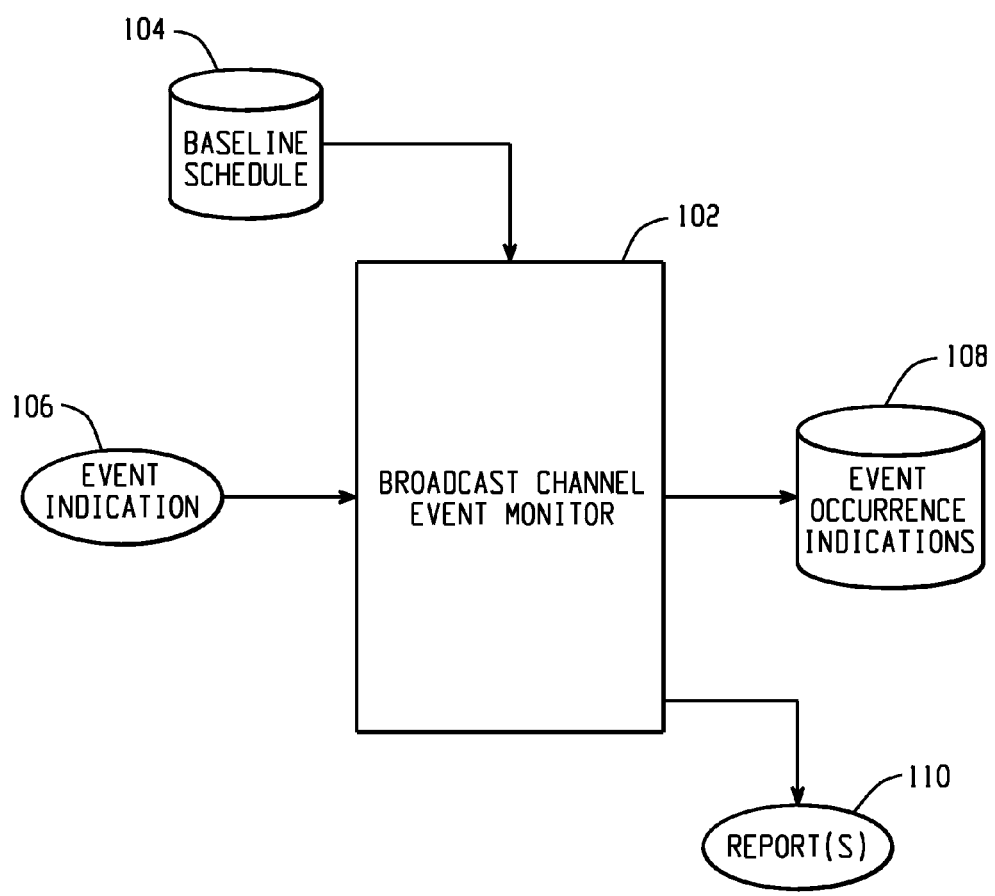
FIG. 1 is a diagram depicting a computer-implemented system for automatically capturing event occurrence data associated with a broadcast channel.

FIG. 1 is a diagram depicting a computer-implemented system for automatically capturing event occurrence data associated with a broadcast channel. A broadcast channel event monitor 102 imports a baseline schedule 104 for the broadcast channel. The baseline schedule 104 identifies events (e.g., programs, advertisements, promotions (promoting the channel or other events on the channel)) scheduled to appear on the broadcast channel and scheduled times for those events. The event monitor 102 further receives an event indication 106 indicating a time of actual appearance of a program event on the broadcast channel.

In one example, a prompt is provided via a graphical user interface for a user to enter a time of actual occurrence of event appearances on the broadcast channel. Certain metadata associated with an event appearance (e.g., event name, event type, event identifier) can be prepopulated based on the baseline schedule. In such a case, a human monitor need only enter (e.g., type in) the time of actual occurrence of the event or confirm that the event was broadcasted as scheduled. When event appearances different more substantially from how they appeared on the baseline schedule 104, the event monitor 102 provides mechanisms for the human operator to perform heavier data entry (e.g., adding and dropping events from the schedule), as described in detail herein.

In another example, event indications 106 are received automatically, such as from an automatic scheduler that provides programming events for broadcast over the channel. By snooping signals (e.g., trigger signals for the programming events), the event monitor 102 can ascertain which programming events are broadcasted over the channel and when.

Based on the baseline schedule 104 and the received event indications 106, the event monitor 102 outputs event occurrence indications 108 for storage in a computer readable medium. Those event occurrence indications 108 can be retained in long term storage for downstream access, such as by FCC compliance personnel as part of a compliance audit. The event occurrence indications 108 can also be used to generate reports 110 in real time or at a later date or time. Those reports can depict a wide variety of data associated with programming events that are broadcasted over the channel. For instance, a report can indicate content programs that did or did not appear on time or advertisement events that were broadcast according to the terms of their underlying contract (e.g., an advertiser is charged $X when their advertisement is displayed in a first commercial slot of a 7:00 P.M. program or during the 8:00 P.M. hour).

Figure 2:
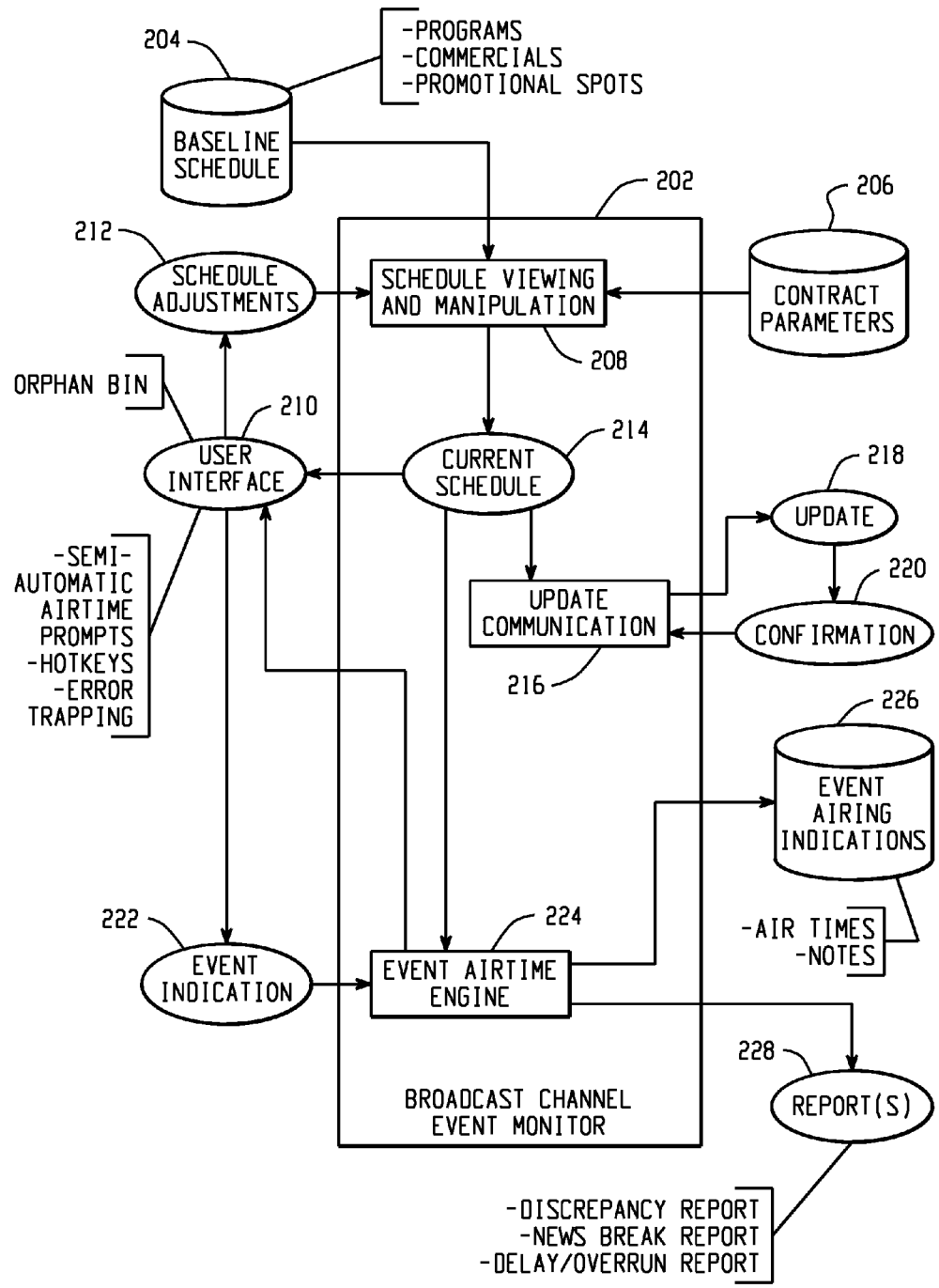
FIG. 2 is a diagram depicting example operations of a broadcast channel event monitor.

FIG. 2 is a diagram depicting example operations of a broadcast channel event monitor 202. The event monitor 202 receives a baseline schedule 204 that identifies events scheduled to be displayed on a channel (e.g., programs, commercials, and promotional spots) and times associated with those events. In one embodiment, the event monitor 202 further receives contract data 206 associated with certain programming of the baseline schedule 204. The event monitor 202 includes a schedule viewing and manipulation module 208 that provides a user interface 210 for viewing and manipulation by a human operator. The human operator can utilize the user interface 210 to manipulate the baseline schedule 204 by making schedule adjustments 212. Such adjustments 212 may be made to conform the current schedule 214 to actual events. For example, where a short special report regarding a weather event is to be broadcast, one or more of programming, commercial, and promotional events can be moved or removed from the baseline schedule. A new entry for the special report can be added to the current schedule 214 so that the ultimate log matches the programming that is actually broadcasted. The event monitor 202 may further track and store notes associated with changes to the schedule. Such notes may be to other human operators or describe why changes were made, so as to recreate the broadcast environment as best as possible if necessary.

For more extensive programming changes (e.g., for a multi-hour special report associated with a major national news event), entire blocks of scheduled programming can be removed from the initial baseline schedule and replaced. In one embodiment, an orphan bin is provided on the user interface 210 for tracking programming that has been removed. Advertisement events are often candidates for inclusion in the orphan bin. As noted earlier, advertisements are often associated with contract parameters 206. Such parameters 206 can dictate under what conditions a broadcaster will be paid. In some instances, those terms are quite strict (e.g., during the Super Bowl, a contract may require that a commercial be played in a first spot of a first commercial break in order for a broadcaster to be paid). But other advertisement contract parameters 206 are much less strict. For example, a contract could allow a broadcaster to be paid for up to three broadcasts of an advertisement during a first half of programming between 8:00 P.M. and 11:00 P.M. on a weekday. Thus, it might be desirable for a baseline schedule 802 to initially include three scheduled instances for the advertisement. If one of those instances is removed and not played, such as due to a special event, an indicator of that instance could be placed in an orphan bin. Because that advertisement could be played at a different time that evening with the broadcaster still being paid, the orphan bin indicator indicates an opportunity for a future revenue generating playing of the commercial.

Upon receipt of schedule adjustments 212 from the human operator to the current schedule 214, the event monitor 202 utilizes update communication functionality 216 to inform others (e.g., persons in charge of further facilitating the broadcast of particular programming) of programming to be broadcast. For example, the update communication functionality 216 may transmit a schedule update notification 218 and receive an acknowledgement 220 from those others that content will be broadcast according to the updated current schedule 214.

The event monitor 202 further receives event indications 222 (e.g., automatically, semi-automatically (e.g., in response to a user interface 210 prompt), manually) indicating a time that each event on the current schedule 214 actually airs. For example, the user interface 210 may provide a control (e.g., a text box) into which the human operator can enter a time that an event aired. Certain hotkeys may be available to quickly enter data associated with common occurrences. For example, typing the Enter key without entering data may result in an airtime being entered that indicates that the programming event was broadcast as scheduled.

An event airtime engine 224 receives the event indications 222 and updates the user interface 210 accordingly. The event airtime engine 224 further stores data, including data from the event indications 222, as event airing indications 226 for later access. Those event airing indications 226 and other stored data such as the current schedule and any notes can be stored in long term non-volatile storage for later access by interested personnel. The event airing indications 226 and other data can also be utilized to generate reports 228. Reports can take a variety of forms, such as a discrepancy report that indicates when programming events are broadcast differently than a baseline schedule 204. A news break report can indicate a precise (e.g., to the second) indication on when a news report is to return from broadcast of commercials or promotional events of the current schedule 214 so that news readers are adequately prepared. A delay/overrun report can indicate content that was broadcast differently than how it was originally scheduled in the baseline schedule 204. Certain of such reports are further depicted and described later herein.

Figure 3:
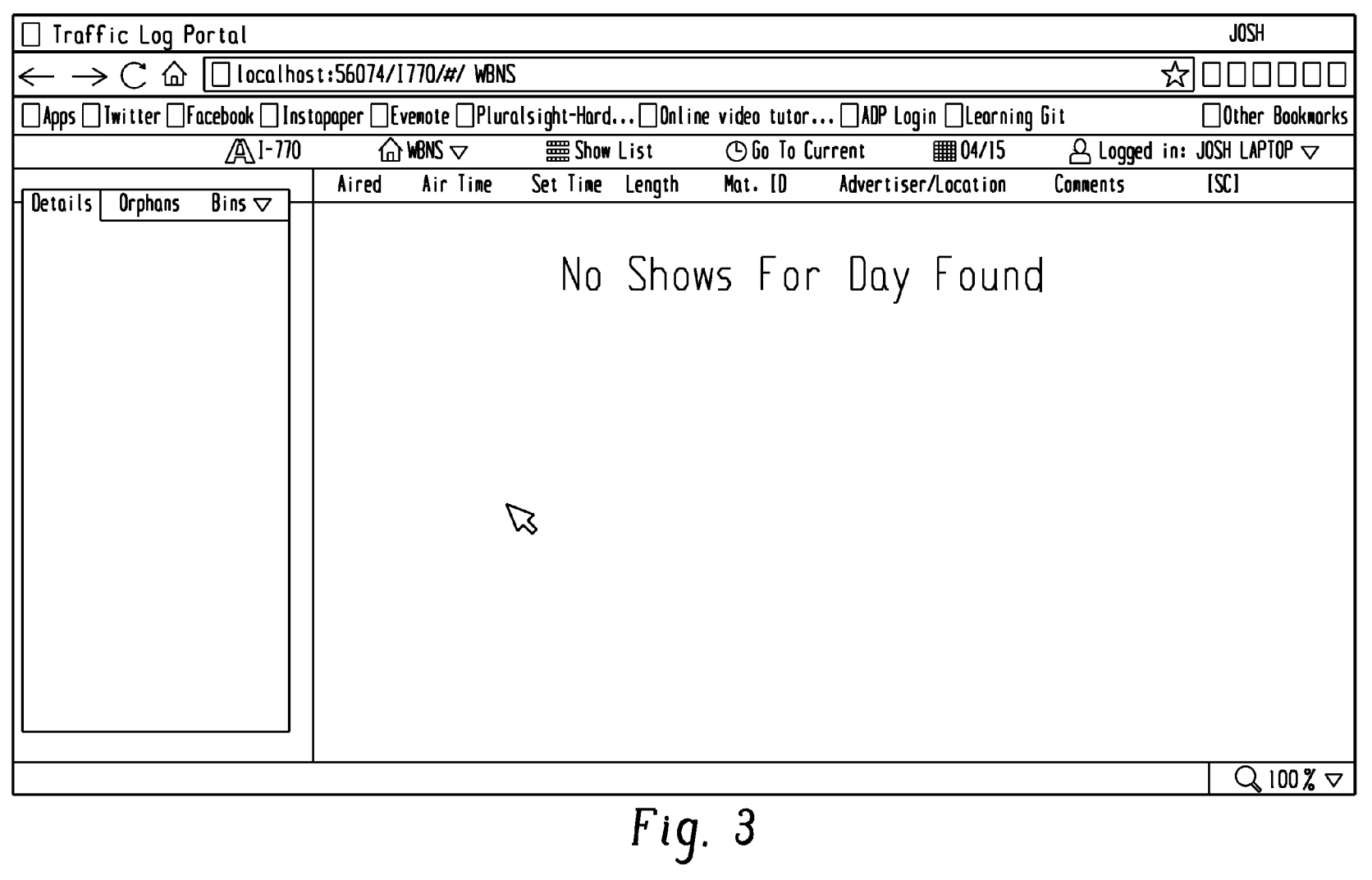

Following is a discussion of a number of user interfaces that can be provided by a broadcast channel event monitor. FIG. 3 is a diagram depicting a user interface provided prior to importing a baseline schedule. FIG. 4 is a diagram depicting an example baseline schedule that can be imported by a broadcast channel event monitor. The baseline schedule includes blocks of time associate with a single program and a further breakout of components of those blocks of time including content portions, advertisements, and promotional portions.

FIG. 5 is a diagram depicting a portion of an imported schedule ready for editing or receipt of event indications. The user interface displays one row for each scheduled portion of a program (e.g., The Young and the Restless). By clicking on a row, selecting a component portion, controls are displayed in a left pane for editing that portion (e.g., editing a name of the component, a runtime, copying the component). In one embodiment, the displayed user interface is a drag and drop interface such that component portions of the program can be moved around, added to, deleted, or otherwise manipulated. An edit/drop indicator enables bulk editing of a block of component portions (e.g., an entire program's worth) at one time. A text box is provided at a left edge of each row for entry on an event indication that indicates when a corresponding event actually aired. A hotkey may auto-fill event indication data to indicate that the event was broadcast as scheduled.

Figure 7:
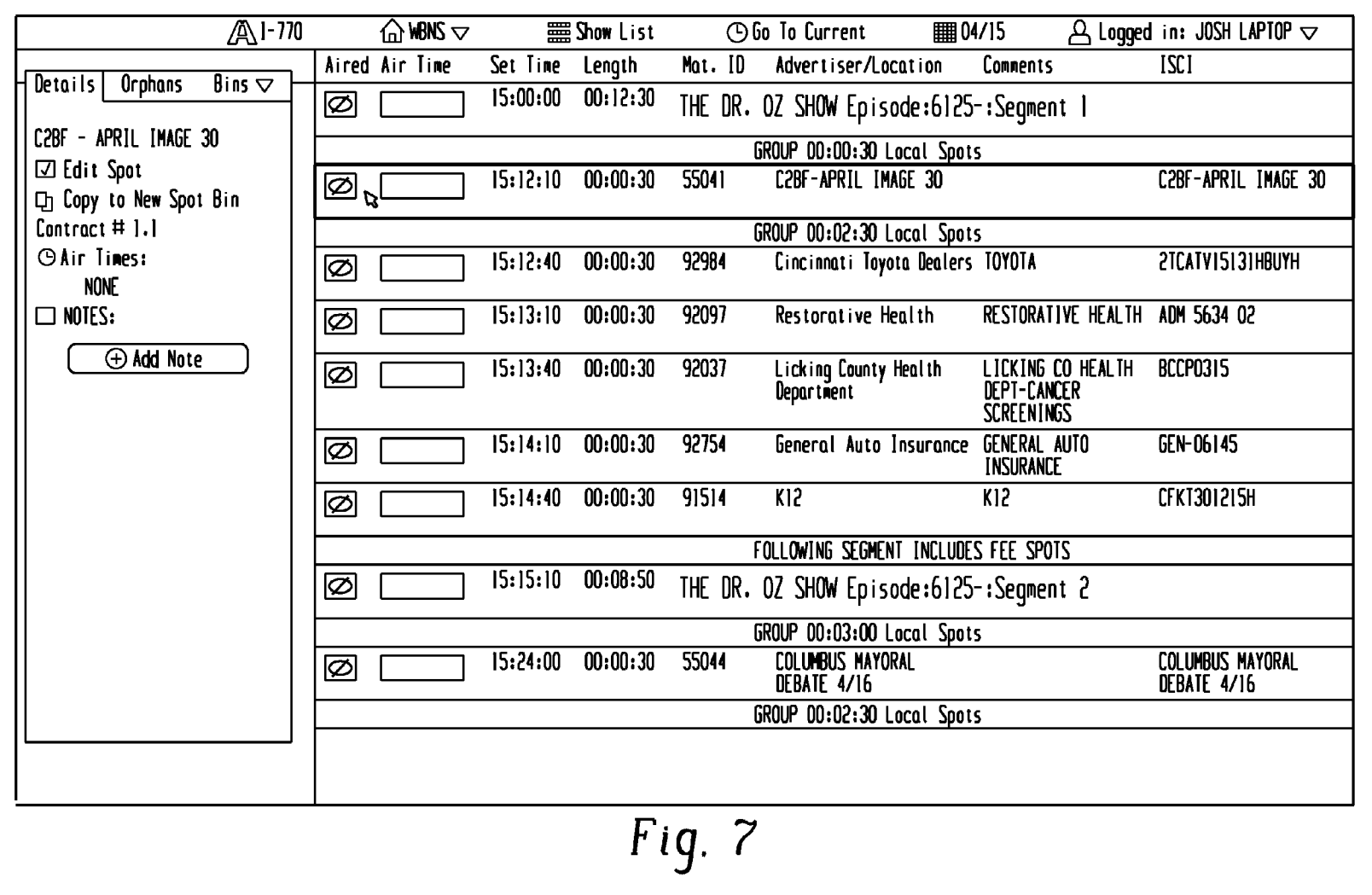

FIG. 6 is a diagram depicting highlighting of a commercial item for potential editing or entry of event indication data. Notice that the left pane indicates a contract associated with that commercial item and times when that commercial may be played where the broadcaster will be paid. By clicking on the contract indicator, further details of the contract may be displayed. FIG. 7 depicts highlighting of a promotional item. It is noted that selecting the promotional item, advertising a later event on the channel, does not result in an associated contract being identified in the left pane.

As noted above, notes may be tracked by a broadcast channel event monitor regarding a variety of types of data, such as when different programming is broadcast. In systems that incorporate human operators, data/notes may also be tracked about the identity of human operators. Such data can be important for compliance activities, where a governing organization requires tracking of who the human operator was at different points in a day. FIG. 8 depicts a note associated with a start of a human operator shift (Josh). FIG. 9 depicts notes associated with both the start and end of a human operator shift. Other notes can be included on a depicted schedule in some embodiments. FIG. 10 depicts notes indicating types of content scheduled to appear in a following portion of programming. Such notes may be reminders or directions to others, such as personnel in charge or readying content for broadcast over the channel.

Figure 11:
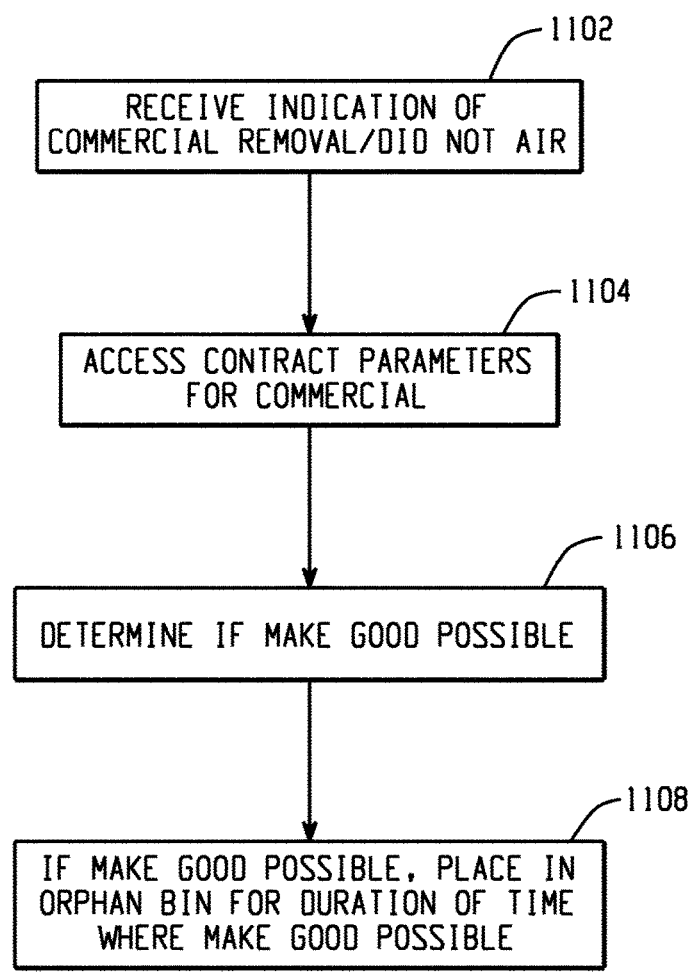
FIG. 11 is a flow diagram depicting a process for tracking and identifying orphaned advertisements.

FIG. 11 is a flow diagram depicting a process for tracking and identifying orphaned advertisements. At 1102, an indication is received that a commercial was removed from the current (or baseline) schedule or otherwise did not air. A review is performed at 1104, 1106 to determine whether the advertisement that did not air can be aired at another time where revenue can still be generated for the broadcaster. At 1104, the contract parameters associated with the commercial that did not air are accessed. At 1106, those contract parameters are reviewed (e.g., automatically) to see if a "make good" is possible, where that commercial is aired at a later time in accordance with the contract for revenue. If a make good is possible, at 1108, that commercial is placed in an orphan bin portion of the graphical user interface, such as for making it available for drag and drop placement at another place on the schedule. In one embodiment, if a make good is not possible, the advertisement is not listed in the orphan bin. In another embodiment, if a make good is not possible, the advertisement is listed with an indication that it cannot be made good (e.g., grayed out, with a red 'X' indication).

FIGS. 12-14 are diagrams depicting example orphan bin operations. In FIG. 12, a commercial for O'Connor, Acciani, & Levy is marked as "Did Not Air" by clicking a left most control. In FIG. 13, the O'Connor advertisement that did not air is indicated in red in the schedule. FIG. 14 depicts an orphan bin that includes the O'Connor advertisement that did not air. Because the O'Connor advertisement can be made good by playing it at a future time, it is displayed. FIG. 14 depicts the beginning of a drag and drop operation, where the O'Connor advertisement is dragged from the orphan bin to another position in the displayed schedule.

FIGS. 15-19 depict user interfaces associated with appending notes to broadcast events. In FIG. 15, a commercial for Cincinnati Toyota Dealers is selected in a displayed current schedule and an Add Note control in a left pane is activated. The user interface of FIG. 15 is displayed to receive a manually entered note. In FIG. 16, a schedule entry associated with a C2BF promotional event is selected by a user. That entry in the schedule indicates a note is stored from that entry with a speech bubble. When the promotional event is selected, the note is displayed in the details pane at the left of the user interface. In the example of FIG. 16, the note indicates when the promotional event was created, indicating that the promotional event was not included in the baseline schedule. FIGS. 17-18 depict adding a note to multiple events at the same time. In FIG. 17, multiple events are selected, indicated by highlighting. In FIG. 18, all of the highlighted events are noted as not having aired by selecting the Did Not Air indicator at the left of one of the entries. An Add Note control (shown in FIG. 16) is selected, initiating the left panel control of FIG. 17. There a note indicating that all of the selected events did not air is entered by a human controller. Upon hitting save, that note is appended to each of the events, such as by creating a record(s) in a database and linking them to the selected events.

FIG. 19 depicts a user interface provided as part of a make good operation for a commercial. The green highlighted commercial for Buckeye Honda had previously not aired. It was placed in the orphan bin and then dragged to its present position. The make good advertisement is highlighted in green to indicate its status. A note is appended to the event stating that it is an attempted make good. In one embodiment, selection of that note or other indicator for the make good event will transition the user interface to display the event's initial positioning that did not air.

FIG. 20 depicts a user interface for otherwise editing an event. Many of the previous displays involve moving events. FIG. 20 depicts example controls for editing certain metadata associated with events. For example, a human operator may edit a name of an event, a length of an event in the current schedule (events may be slightly stretched or compressed in time using video/audio processing software in a largely unnoticeable way), comments on the event and an event identifier (ISCI) that identifies the actual content for the event, such as in a video or audio database.

FIG. 21 depicts a trash bin for temporary storage of events provisionally identified as deleted. In some embodiments, a human operator is unable to delete events initially present in a baseline schedule. Such items in that embodiment can only be marked as Did Not Air and otherwise notated. When an event is created by a human operator, such as during a day in the midst of a special news report, the human operator may be permitted to delete such event. That deleted event is positioned in the trash bin of FIG. 21, from where it may be permanently deleted or reinstated into the current schedule.

As noted above, a human operator may sometimes wish to create an event. FIG. 22 is a user interface provided for event creation. A human operator populates fields of the form, such as the event name, type, length, and location indicator.

FIG. 23 depicts a promotional event search. Promotional events bring attention to a station or future events on the station, such as an upcoming show. Promotional events are typically non-revenue and can have varying lengths. The variety of lengths (as short as a few seconds) makes promotional events good candidates for filling small holes in a schedule. The interface of FIG. 23 depicts a dropdown for searching a cache of promotional events for an event at, near, above, or below a selected length. Best matching promotional events are depicted in a list and can be dragged into the current schedule. FIG. 24 depicts a result list for the search of FIG. 23.

Figure 31:
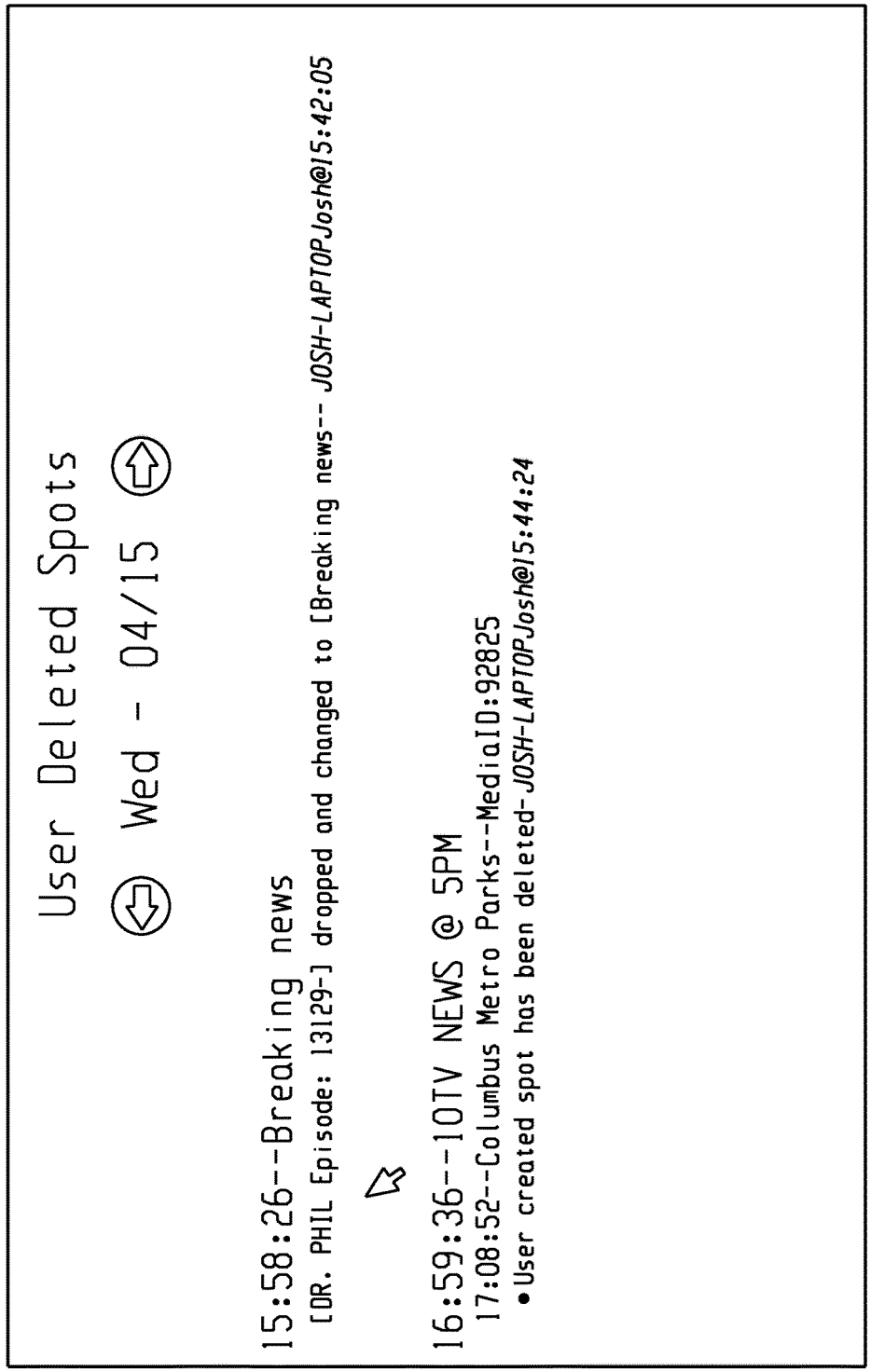

FIGS. 25-31 depict sample reports that can be provided based on schedule data and event airing indications. FIG. 25 depicts a detail report associated with a Restorative Health advertisement. The report indicates metadata associated with the event including its name, length, and allowable air times. The report further indicates notes for the event, including a note that the advertisement did not air (as part of the earlier selection of multiple events and notating them). FIG. 26 is a report that indicates all events for a day that did not air. The report of FIG. 26 is sorted and notated to show of which content programming the component events that did not air were a part. FIG. 27 is a discrepancy report that identifies content events (e.g., shows or portions of shows) that did not air. FIG. 28 is a report that indicates content events that did not start or end on time. In the example of FIG. 28, a content event that was supposed to start at 15:00 was started and quickly ended at 15:05, resulting in its inclusion in the report of FIG. 28. FIG. 29 is a report indicating all content events that were broadcast during a day. FIG. 30 is a news break report that indicates an exact or near exact time when news anchors will give live reports, such as coming out of commercial breaks. Such a report allows an anchor to properly prepare and not be surprised when the time for live news reading to begin. FIG. 31 is a report that indicates events created and then deleted by a human operator.

Figures 32, 33:
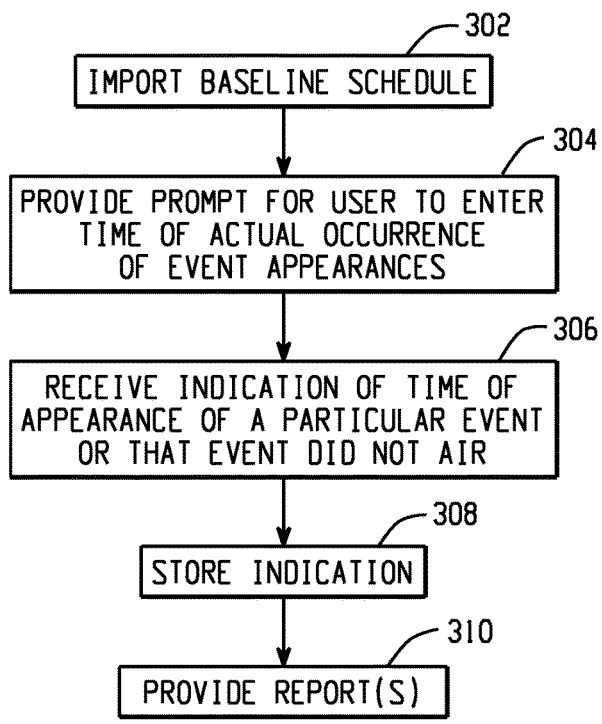
FIG. 32 is a diagram depicting controls for exporting event airing indication data.
FIG. 33 is a flow diagram depicting a computer-implemented method for automatically capturing event occurrence data associated with a broadcast channel.

At the end of a time period under consideration (e.g., a day), the log files that are in some embodiments human operator verified, are exported for long term storage, analysis, and composite report generation. FIG. 32 is a diagram depicting controls for exporting event airing indication data.

FIG. 33 is a flow diagram depicting a computer-implemented method for automatically capturing event occurrence data associated with a broadcast channel. At 302, a baseline schedule for the broadcast channel is imported that includes an identification of events scheduled to appear on the broadcast channel and scheduled times for those events. A prompt is provided at 304 via a graphical user interface for a user to enter a time of actual occurrence of event appearances on the broadcast channel. At 306, indications of times of an appearance and that events did not air on the broadcast channel are received via the prompt. The indications are stored in a computer-readable medium at 308, and a report is provided at 310 that identifies events that did appear on the broadcast channel and their time of appearance and events that did not appear on the broadcast channel.

Figure 34:
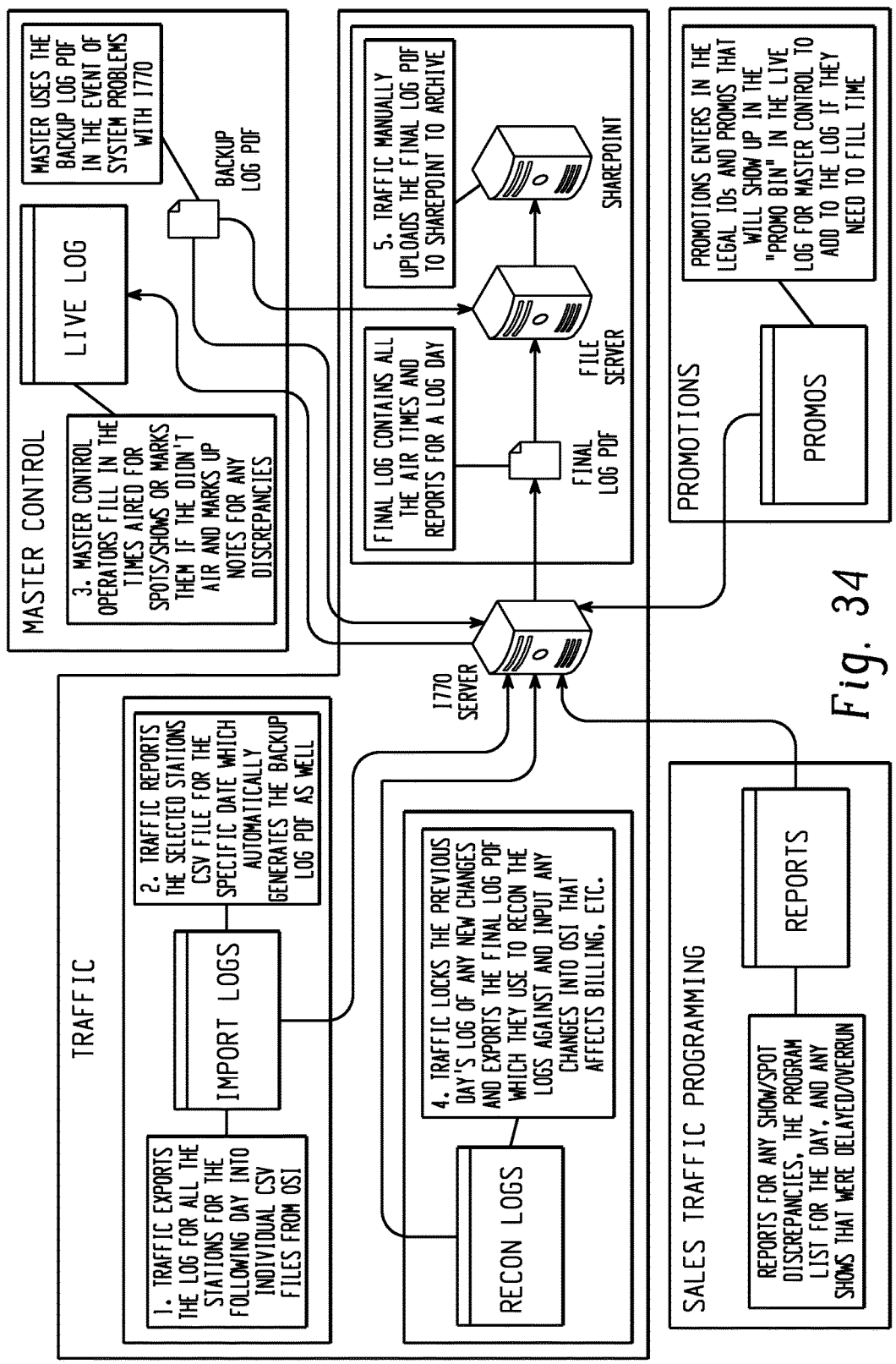
FIG. 34 depicts a flow of data through the example system.

Systems and methods as described herein can take a variety of forms. Following is a description of certain features that may be included in one sample embodiment dubbed an I-770 Traffic Log System. FIG. 34 depicts a flow of data through the example system. In the embodiment, certain beginning processes are performed. Traffic personnel export a file of all the commercial log data for a given day from the station's Commercial Traffic and Billing software as a baseline schedule. The file type that is exported is a CSV from the Landmark OS Traffic & Billing system. The importing module of I-770 is interchangeable to easily allow for the processing of any file type or column structure that can be exported from all of the major commercial Traffic management software companies.

The Traffic user will select the desired log day and the station that the file is for. The information will default to the main station as well as the following day's date. The user will select a type of log from a list. The final item needed is the 'Choose File' button where the user navigates to the desired log file to be imported. Once the user clicks on 'Upload' the file will be uploaded and the import process will start. If the file type is not recognized or there is a problem reading the file an error will be displayed. If the convention based standard date format or station letter code of the input file does not match the entered information on the form a warning will be presented to the user. They can choose to continue to process the file or cancel the operation and edit the appropriate settings.

The import process uses the originally exported CSV file from the Traffic Billing Software System (TBSS) to extract and build a Live Log based upon Master Control's specifications and needs. This import process also removes all extraneous information from the log that is not needed for daily operation. The log is built in sequential order based upon the show, segment, and commercial spot scheduled times. All items in a show are categorized as to whether it is a segment, commercial spot, informational notation, or grouping. These categories will affect how the item gets displayed in the Live Log interface and how the Master Control Operator is able to interact with it.

Imported logs may take one of different forms. A typical log is the default option when importing the usual commercial spot log for the following day. When there are major changes that need to be made to the log over multiple hours, Traffic can generate a new section of the log to replace the existing shows/spots called the Alt Log. This typically happens in breaking news or weather situations where regular programming does not air for hours at a time.

When importing an Alt Log the import process will examine and identify all of the replacement spans of time. It will then mark all shows and spots that exist within those spans as replaced and import the new shows in line with the rest of the log. Replaced shows will still exist in the log but all spots will be collapsed down and the show name will be grayed out with a strike through it. There is an expand button to the right of the show name to allow the show to be expanded if the associated spots/segments need to be viewed. By default during typical usage the [Down Arrow]/[Enter] and [Down Arrow] keyboard navigation will skip over the replaced shows. The new shows will have 'ALT LOG' appended to the end of the name of the show and segments to denote that it was not a part of the regular day's log.

The 'Replace Previous' option will delete the selected log day and import the selected file in its place. This is the only case in the entire system in this embodiment where a spot can be deleted. Replacing a previously imported log is only available for future days and will return an error if trying to replace a current or past days log. This in turn would erase all previously entered log data.

The following describes example live log, master control operations. By default when the Live Log is loaded for a given station the shows and associated spots will load for an hour before and two hours ahead of the current time. This enables the operator to always see a three hour window of the log at a time. The operator can jump to a specific section in the log day by using the Show List or automatically select the current item that is scheduled to be on-air by using the 'Go to Current' button.

Once a spot has aired the operator will click into the Air Time text box for that spot and type in the exact time that has aired in the military time format 'HH:MM:SS'. If the spot did not air for any reason they will click on the 'Did Not Air' button (depicting an eye with a line through). This will highlight the spot in red to denote that it didn't air and will disable and hide the Air Time text box. The 'Did Not Air' button is able to be toggled so it can be clicked again to allow the Air Time to be entered as usual if the spot did indeed air correctly.

Typically, once an Air Time is entered by the operator they will hit the [Enter] key or [Down arrow] on the keyboard to select the next spot/segment. The Air Time text box of the next item will be automatically selected as well to allow for quickly entering in air times back-to-back without having to use the mouse. As soon as an Air Time is entered or a spot is marked as 'Did Not Air' the changes are automatically saved back to the server immediately. If there are any errors communicating with the server the user will receive a notification to contact the IT Department. All subsequent changes will be cached locally and will be synced automatically once a connection to the server has been established again.

When using the [Enter] key or the [Up arrow]/[Down arrow] keys to navigate up and down the Live Log, it will automatically and seamlessly load additional log data. When there are only three spots left (at the top if going up, or bottom if going down) the next two hour chunks of log data will append to the end while the prior hour will drop off the interface. By only keeping a three hour window at a time it allows the information management and the interface to operate very fast. This also gives the appearance of one continuous log that will smoothly flow from one log day to the next. The operator can also manually load log data before or after the current three hour window by clicking on the 'Older' or 'Newer' buttons that are available at both the top and bottom of the log.

The station selector displays the currently loaded station. When clicked a list of available stations is shown and if a different station is selected the corresponding log will be loaded. Once a Master Control operator begins their shift they will go to the 'Logged In:' section in the black navigation bar and select 'Start Shift'. This will insert a notational line in the traffic log at the current date and time with the user's name and the time started. Similarly 'End Shift' will do the same only denoting that the user ended their shift at a given time. These notational lines show up as a green line and are also listed in the Final PDF Log file. The primary purpose of this function is to show which operator was on duty, should there be any questions about how a log was completed. The Details Tab contains additional information about a selected show or spot such as the contract number, air time window, and all associated notes. It contains the buttons for editing, or copying to the New Spot Bin. Users are also able to create, edit, and delete notes from this tab as well.

The edit spot button brings up a modal window that allows a user to edit the Name, Material ID, Comments, and ISCI for a typical spot. If the spot is a user created spot they will also be able to edit the Scheduled Time and Length as well. On the right side of the window all spots that occur in the future from the current time that have the same Material ID are listed with their Scheduled Time. When saving changes, users are able to make the specified changes to only the current spot, or to propagate them out to all future matching spots currently in the system.

After a spot has been edited a system note will automatically be created and attached to all changed spots containing both the original and new values. This is done in order to keep a running log of who changed the data from the original set log.

Once a spot has been edited by the Traffic Department it will need to be changed by the Master Control Operator in the automation system in order for it to air correctly. Previously, the Traffic Department had to call down to notify the operator of the change. In the example system, there is a messaging bin in the main navigation bar for both Traffic and Master Control. When the Traffic Department makes a change to any spot an alert will immediately pop-up for the Master Control Operator notifying them of the pending changes. When the message is clicked a window will pop-up with all the requested changes to be made. Once the Master Control Operator has made the changes they will click 'Acknowledge' or 'Reject' on the message and the Traffic Department will be notified that it has been completed or there was a problem. This back and forth acknowledgement will create a checks & balances system that will ensure changes are completed correctly. This feature will speed up the Traffic Department spot replacement and changes process.

The 'Copy to New Spot Bin' button copies the currently selected spot (Name, ISCI, Material ID, Length, Comments) into the New Spot Bin. This enables the Master Control Operator to quickly rebuild the show's segments if the lengths are similar. Additionally they could copy an existing spot to another section in the log.

Notes are auto-populated with the current user that created it as well as the time the note was created. Users are able to go back and edit a user created note and re-save or delete them. Some notes are auto-generated by the system automatically for logging purposes. A system note is generated when a user makes any changes to an existing spot or show other than marking it as Did Not Air or filling in the Air Time. These system notes can only be edited or deleted by the Traffic Department. A single note can be added to one spot, multiple spots, or an entire show. Notes are what populate the Discrepancy Report and are typically written up to report any anomalous events that effect on-air.

In the event an entire show is replaced, due to breaking news or a run over from network sports, a show can be edited or dropped. Once the 'Edit/Drop Show' button is clicked the Master Control Operator will be able to change the name of the show to the event that has replaced it. There is then the option to drop all show segments if the existing commercials will be able to air at the scheduled time, or drop all segments and spots as well. Once a show has been dropped the operator will be able to rebuild the show by creating new segments (using the New Spot Bin) for the replacement show as well as trying to "Make Good" when available the now orphaned shows. An automatic system note is generated for the show denoting the original name and the new value that was changed for logging purposes.

The Orphan Bin displays any commercial spots that were marked as 'Did Not Air' for the current log day that are still within their contract air time window. The spot is displayed with the Name, ISCI and Length. There is a "further information" button where all other detailed information is shown, such as the original air time, contract number, any associated notes, and the make good contract air time window.

Once the Master Control Operator finds an acceptable time to try and re-insert the orphan they can click and drag it directly into the log. Depending on where it is dragged the set time will be automatically created based on the previous or next spot. A system note is automatically created on the original orphaned spot in the log with the time that the make good was attempted. If the subsequent make good spot does not air, another note is added to the original orphaned spot indicating that it failed to be made good at the specified time.

If the user tries to drag an orphaned spot to a time that is outside of its make good window a warning will tell the Operator of the error. They are then able to force it into the log by confirming the warning message, or cancel it to send the orphaned spot back to the bin.

The station's current orphans, which are still within their make good window, will be listed in an orange bubble next to the Orphan's tab. Once a spot is made good it will display in the log highlighted in green. There will be an additional button in the Details Tab to 'View Original Spot Details'. This button will pop-up a window with the original air time, notes, and other information from the original orphaned spot.

The example system is configured to support detection and validation of bookend and piggyback spots. Bookend spots are spots that are purchased and split with one at the start of a break and one at the end of the commercial break. Piggyback spots are those that air back to back but are also purchased as one block. Because these spots are purchased as a single spot there are unique business rules for them. When one of the spots does not air, both will be considered non-billable. This will affect how they go to the Orphan Bin and any automated system notes.

Because of slight differences from normal spots both bookend and piggyback spots will be denoted in the log to let the Master Control Operator know of their presence. Bookend spots will have a black icon of a book and piggyback spots will have a black icon of two links of a chain.

The New Spots Bin allows a Master Control Operator to insert a new spot or segment/cut-in to the log. The user fills out the new Name, type of spot (spot or segment/cut-in), Length, Material ID, Comments and ISCI and then clicks save to add it to the bin.

Once the Master Control Operator creates the spot they click and drag the item directly into the log. Depending on where the spot is dragged the set time will be automatically created based on the previous or next spot. When inserted, a system note is automatically created containing the user name and time the spot was placed in the log.

The user created spots are only saved locally and only for the current browser session. This is done to prevent the bin from getting filled with old spots or needing to be regularly cleaned out manually. The New Spot Bin allows the user to rebuild a dropped/replaced show with the new segment names and break structure.

The Promo Bin retrieves all promotional spots in the system based on the selected length in seconds. This allows the Master Control Operator to quickly find a promo to insert in the event that they need to fill a certain amount of time in the log. Once the Master Control Operator finds the desired spot they click and drag the item directly into the log. Depending on where it is dragged the Scheduled Time will be automatically created based on the previous or next spot. Once inserted, a system note is automatically created containing the user name and time the spot was placed in the log.

A number of time saving features are incorporated into the example system. A 'Show List' allows a user to jump to a specific show in the log without having to manually scroll through the entire day to find it. When clicked it opens a modal window with the program list of shows for the current log day listed by their Scheduled Time and Length. The current log day is displayed at the top and the user can click on the arrow buttons to skip ahead or go back a day. Once a show name is clicked the Live Log will then load that show as well as the next two hours to the screen. A 'Go to Current' button in the top bar allows a user to always go back to the currently scheduled event and three hour window based on real time of day no matter where they are in the Live Log interface. The currently scheduled event will be highlighted. When clicked, the date in the black navigation bar next to the 'Logged In' user will expand out into a mini-calendar date chooser. The user can toggle through the different months and click on the desired day to browse. Once the day is selected the 'Show List' window will display the program lists for the specified day. As another example, wherever there is a time that can be entered (e.g. Air Time, Length of a user created spot) the input box will automatically insert colons, as the user types, to delineate between hours, minutes, and seconds. The input box will only allow valid military time formats and any partially filled out times are cleared out.

A number of keyboard shortcuts are also included:

[CTRL+A]: Mark selected spot or spots as 'aired correctly' copying the set Scheduled Time in the Air Time.

[CTRL+D]: Marks the selected spot or spots as Did Not Air.

[CTRL]: When held down, allows user to select multiple items by clicking on the desired spots.

[Shift]: When held down, selects the entire range of spots between the currently selected spot and the second spot that is clicked further down the log.

[Enter] OR [Down arrow]: Selects the next spot in the log and highlights the Air Time box to allow for quick time entering.

[Up arrow]: Selects the previous spot in the log and highlights the Air Time box to allow for quick time entering.

Mouse-Double Click: If another bin tab was selected, when a spot is double-clicked the left static tab panel will go back to the Details tab in order to quickly view the detailed spot information.

The example system includes customizable permission levels as follows:

Master Control—Full access: Mark spot as Did Not Air, fill in air times, edit or drop existing spots and shows, start/end shift, add notes, create spots/segments, and drag spots into the log from the bins.

Traffic—Mark a spot as Replaced, edit spot, add notes, and create spots/segments.

Notes Only—View all data currently in the system, add spot/segment, and show notes.

Read-Only—Only able to view all current existing data, including notes.

In the example system, when a Traffic user visits the Live Log interface instead of being able to mark a spot as did not air, they will mark it as replaced. Replaced spots are not added to the Orphan Bin, show as purple in the Live Log, and are shown in the Discrepancy report as replaced by Traffic. Traffic will also not be able to enter or change any of the aired times for the spots. If Traffic edits a spot it will also be highlighted in purple.

The current schedule is colorized in the example system as follows:

Red=Spot did not air.

Light Blue with Black Text Bubble Icon=Spot has an associated note.

Yellow=Spot created by a Master Control Operator.

Green=Orphan spot that was able to be made good later on.

Purple=Indicates a change made by the Traffic Dept.

Dark Blue=Indicates an EAS test is logged.

Dark Grey=Indicates the spot or spots are currently selected.

The export process locks the logs for the day and generates certain reports. All reports are live and are generated dynamically when loaded so that any changes that happened in the system will be reflected instantaneously. There are arrows at the top to allow the user to go to the prior or next log day's list. The calendar in the top navigation bar can also be used to quickly move to a specified date.

The Discrepancy Report, for a given log day, displays all of the spot/show notes, any system notes, spots that Did Not Air, and spots marked as replaced by the Traffic Department. Spots are grouped with their parent show and are displayed with their scheduled time and Material ID. Notes that are created by users are displayed in blue where system notes are italicized and in a light grey color. There is also a button to filter any commercial spots revealing only show and segment notes to aid in reporting any broadcast network discrepancies.

The News Break Report shows the total amount of break time in-between segments for all newscasts. This report is used primarily by the News Department so the directors/producers know exactly how long a break is and how much time to accommodate for between segments.

The Delay/Overrun Report displays shows that did not start at the scheduled time or were dropped altogether. If the show started late (delay) the previous show (overrun) is shown. All shows are listed with their actual aired start time and end time. If there is a note on the show or on the first segment of the show it will be displayed under the show name. This is helpful in quickly figuring out why a show was delayed without having to refer back to the Live Log or Discrepancy Report. The threshold when a show is considered late is a station specific system setting based on the number of seconds that the show differs from the Scheduled Time.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of automatically capturing event occurrence data associated with a broadcast channel, comprising:

importing a baseline schedule for the broadcast channel, comprising identification of events scheduled to appear on the broadcast channel and scheduled times for those events;

providing a prompt via a graphical user interface for a user to enter a time of actual occurrence of event appearances on the broadcast channel;

receiving indications of times of an appearance and that events did not air on the broadcast channel via the prompt;

storing the indications in a computer-readable medium;

providing a report that identifies events that did appear on the broadcast channel and their time of appearance, and events that did not appear on the broadcast channel;

receiving a command to adjust the baseline schedule to form an updated schedule in response to the report;

communicating the updated schedule to an entity to command changing of events to appear on the broadcast schedule; and receiving an acknowledgement of the changing of events from a master control user;

wherein upon an adjustment to the baseline schedule that affects a scheduled event, a note is associated with the scheduled event that includes data associated with the adjustment; and wherein the data associated with the adjustment includes an identification of a person who made the adjustment.

2. The method of claim 1, further comprising:
providing an orphan event display on the graphical user interface;
wherein when an event is indicated as did not air, the event is added to the orphan event display.

3. The method of claim 2, wherein the event that did not air is a commercial, wherein the commercial is subject to a contract time period that indicates dates or times that the commercial can air, wherein the commercial remains in the orphan event display for as long as a current time is within the contract time period.

4. The method of claim 3, further comprising receiving a command to replace a promotional event in the baseline schedule with the commercial from the orphan event display.

5. The method of claim 1, wherein the baseline schedule is adjusted based on occurrence of a real-world event that was not known to occur when the baseline schedule was imported.

6. The method of claim 5, wherein the real world event is a weather event, an accident event, a political event, or a war event.

7. The method of claim 1, wherein the note provides an audit trail of changes to the scheduled event.

8. The method of claim 1, further comprising:
receiving an indication of a personnel login of a particular person;
wherein the note is updated to indicate an identity of the particular person currently logged in.

9. The method of claim 1, wherein the adjustment to the baseline schedule comprises an adjustment to a particular event;
wherein upon receipt of a propagate command, the adjustment to the particular event is propagated to other similar events occurring at different times.

10. The method of claim 9, wherein the adjustment to the particular event is an adjustment to the running length of the particular event.

11. The method of claim 1, wherein the adjustment removes all events from a portion of the baseline schedule;
wherein the removed events are identified in a portion of the graphical user interface;
wherein events in that portion of the graphical user interface can be reinserted into the updated schedule.

12. The method of claim 1, further comprising:
receiving the indication in the form of a hotkey entry indicating that a highlighted event aired as scheduled.

13. The method of claim 1, further comprising:
receiving the baseline schedule that indicates events scheduled to appear on the broadcast channel for one day;
loading a portion of the baseline schedule consisting of a portion of the baseline schedule that is less than a day into memory;
displaying scheduled events identified in the portion of the baseline schedule on the graphical user interface.

14. The method of claim 1, wherein the baseline schedule is received from a first application platform, wherein indications of air times are exported to the first application platform after an end of a broadcast day.

15. The method of claim 1, wherein the report comprises one or more of:

a discrepancy report indicating differences between the baseline schedule and events that actually did air; a news break report that indicates an amount of time between segments of a news program event; a delay/overrun report indicating programs that did not end as indicated on the baseline schedule.

16. The method of claim 1, wherein the events comprise programs, commercials, and promotional spots;
wherein a program is an event displayed on the broadcast channel for entertainment purposes;
wherein a commercial is an event displayed on the broadcast channel in exchange for payment to the broadcast channel; and
wherein a promotional spot is an event that promotes the broadcast channel or another program scheduled to appear on the broadcast channel.

17. The method of claim 1, wherein the report is provided for a compliance review by the Federal Communications Commission.

18. The method of claim 1, wherein the report is provided for billing advertisers based on the appearance of commercial events on the broadcast channel.

19. A computer-implemented system for automatically capturing event occurrence data associated with a broadcast channel, the system comprising:
a processing system comprising one or more data processors;
a non-transitory computer-readable storage medium encoded with instructions for commanding the processing system to operate steps that include:
importing a baseline schedule for the broadcast channel, comprising identification of events scheduled to appear on the broadcast channel and scheduled times for those events;
providing a prompt via a graphical user interface for a user to enter a time of actual occurrence of event appearances on the broadcast channel;
receiving indications of times of an appearance and that events did not air on the broadcast channel via the prompt;
storing the indications in a computer-readable medium;
providing a report that identifies events that did appear on the broadcast channel and their time of appearance, and events that did not appear on the broadcast channel;
receiving a command to adjust the baseline schedule to form an updated schedule in response to the report;
communicating the updated schedule to an entity to command changing of events to appear on the broadcast schedule; and
receiving an acknowledgement of the changing of events from a master control user;
wherein upon an adjustment to the baseline schedule that affects a scheduled event, a note is associated with the scheduled event that includes data associated with the adjustment; and
wherein the data associated with the adjustment includes an identification of a person who made the adjustment.

20. A non-transitory computer-readable medium encoded with instructions for commanding one or more data processors to execute steps of a method for automatically capturing event occurrence data associated with a broadcast channel, the steps comprising:
importing a baseline schedule for the broadcast channel, comprising identification of events scheduled to appear on the broadcast channel and scheduled times for those events;

providing a prompt via a graphical user interface for a user to enter a time of actual occurrence of event appearances on the broadcast channel;
receiving indications of times of an appearance and that events did not air on the broadcast channel via the prompt;
storing the indications in a computer-readable medium;
providing a report that identifies events that did appear on the broadcast channel and their time of appearance, and events that did not appear on the broadcast channel;
receiving a command to adjust the baseline schedule to form an updated schedule in response to the report;
communicating the updated schedule to an entity to command changing of events to appear on the broadcast schedule; and
receiving an acknowledgement of the changing of events from a master control user;
wherein upon an adjustment to the baseline schedule that affects a scheduled event, a note is associated with the scheduled event that includes data associated with the adjustment; and
wherein the data associated with the adjustment includes an identification of a person who made the adjustment.

21. The computer-implemented system of claim 19, wherein the steps further include providing an orphan event display on the graphical user interface, wherein when an event is indicated as did not air, the event is added to the orphan event display, and the event that did not air is a commercial, the commercial is subject to a contract time period that indicates dates or times that the commercial can air, the commercial remains in the orphan event display for as long as a current time is within the contract time period.

22. The non-transitory computer-readable medium of claim 20, wherein the steps further comprise providing an orphan event display on the graphical user interface, wherein when an event is indicated as did not air, the event is added to the orphan event display, and the event that did not air is a commercial, the commercial is subject to a contract time period that indicates dates or times that the commercial can air, the commercial remains in the orphan event display for as long as a current time is within the contract time period.

23. The computer-implemented system of claim 19, wherein the baseline schedule is adjusted based on occurrence of a real-world event that was not known to occur when the baseline schedule was imported, and the real world event is a weather event, an accident event, a political event, or a war event.

24. The non-transitory computer-readable medium of claim 20, wherein the baseline schedule is adjusted based on occurrence of a real-world event that was not known to occur when the baseline schedule was imported, and the real world event is a weather event, an accident event, a political event, or a war event.

25. The computer-implemented system of claim 19, wherein the note provides an audit trail of changes to the scheduled event.

26. The non-transitory computer-readable medium of claim 20, wherein the note provides an audit trail of changes to the scheduled event.

27. The computer-implemented system of claim 19, wherein the steps further include receiving an indication of a personnel login of a particular person, wherein the note is updated to indicate an identity of the particular person currently logged in.

28. The non-transitory computer-readable medium of claim 20, wherein the steps further comprise receiving an indication of a personnel login of a particular person, wherein the note is updated to indicate an identity of the particular person currently logged in.

29. The computer-implemented system of claim 19, wherein the adjustment to the particular event is an adjustment to the running length of the particular event.

30. The non-transitory computer-readable medium of claim 20, wherein the adjustment to the particular event is an adjustment to the running length of the particular event.

* * * * *